US011441907B2

(12) United States Patent
Ishigami et al.

(10) Patent No.: US 11,441,907 B2
(45) Date of Patent: Sep. 13, 2022

(54) POSITIONING DEVICE AND POSITIONING METHOD

(71) Applicant: Mitsubishi Electric Corporation, Tokyo (JP)

(72) Inventors: Tadatomi Ishigami, Tokyo (JP); Takashi Irie, Tokyo (JP); Masatoshi Fujii, Tokyo (JP); Ryusuke Kinoshita, Tokyo (JP); Kohei Fujimoto, Tokyo (JP); Masashi Kido, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 470 days.

(21) Appl. No.: 16/475,529

(22) PCT Filed: Jan. 30, 2017

(86) PCT No.: PCT/JP2017/003142
§ 371 (c)(1),
(2) Date: Jul. 2, 2019

(87) PCT Pub. No.: WO2018/138904
PCT Pub. Date: Aug. 2, 2018

(65) Prior Publication Data
US 2021/0215485 A1    Jul. 15, 2021

(51) Int. Cl.
*G01C 21/16*    (2006.01)
*G01S 19/39*    (2010.01)
(Continued)

(52) U.S. Cl.
CPC .......... *G01C 21/188* (2020.08); *G01S 19/22* (2013.01); *G01S 19/33* (2013.01); *G01S 19/396* (2019.08);
(Continued)

(58) Field of Classification Search
CPC ..... G01C 21/188; G01S 19/22; G01S 19/396; G01S 19/43; G01S 19/49; G01S 19/52
See application file for complete search history.

(56) References Cited

U.S. PATENT DOCUMENTS

| 6,545,638 | B2 * | 4/2003 | Sladen | ................. | G01C 21/28 |
| | | | | | 342/357.32 |
| 2007/0222674 | A1 * | 9/2007 | Tan | ................... | G06Q 10/08 |
| | | | | | 342/357.32 |

(Continued)

FOREIGN PATENT DOCUMENTS

| CN | 102540228 A * 7/2012 | |
| EP | 1729145 A1 * 12/2006 | ............ G01S 19/22 |

(Continued)

OTHER PUBLICATIONS

English Translation of JP 2009211681 A (Year: 2021).*
(Continued)

*Primary Examiner* — Bernarr E Gregory
*Assistant Examiner* — Fred H Mull
(74) *Attorney, Agent, or Firm* — Birch, Stewart, Kolasch & Birch, LLP

(57) ABSTRACT

In a locator device, a dead reckoning part calculates a position of a subject vehicle by dead reckoning. A pseudorange smoothing part smooths a pseudorange between a GNSS satellite and a position of the subject vehicle using a carrier wave phase of the GNSS satellite. A GNSS receiver positioning error evaluation part evaluates reliability of the position of the subject vehicle calculated by the multi-GNSS receiver. A GNSS positioning part (Kalman Filter (KF) method) calculates a position of the subject vehicle from a smoothed value of the pseudorange, a positioning augmentation signal, and an orbit of the GNSS satellite. A complex positioning part (KF method) calculates an error in the dead reckoning from the position of the subject vehicle calculated
(Continued)

by the GNSS positioning part (KF method), and corrects the position of the subject vehicle calculated by the dead reckoning part based on the error in the dead reckoning.

10 Claims, 18 Drawing Sheets

(51) Int. Cl.

| | |
|---|---|
| G01S 19/22 | (2010.01) |
| G01S 19/33 | (2010.01) |
| G01S 19/41 | (2010.01) |
| G01S 19/43 | (2010.01) |
| G01S 19/46 | (2010.01) |
| G01S 19/49 | (2010.01) |
| G01S 19/52 | (2010.01) |

(52) U.S. Cl.
CPC .............. *G01S 19/41* (2013.01); *G01S 19/43* (2013.01); *G01S 19/46* (2013.01); *G01S 19/49* (2013.01); *G01S 19/52* (2013.01)

(56) References Cited

U.S. PATENT DOCUMENTS

| | | | |
|---|---|---|---|
| 2008/0071476 A1 | 3/2008 | Hoshizaki | |
| 2010/0231443 A1* | 9/2010 | Whitehead | G01S 19/32 |
| | | | 342/357.23 |
| 2011/0235686 A1 | 9/2011 | Kojima et al. | |
| 2015/0057028 A1* | 2/2015 | Rudow | G01C 21/20 |
| | | | 455/456.3 |
| 2015/0149073 A1* | 5/2015 | Ishigami | G01S 19/42 |
| | | | 701/409 |

FOREIGN PATENT DOCUMENTS

| | | | |
|---|---|---|---|
| JP | 2002-196060 A | | 7/2002 |
| JP | 2007-225459 A | | 9/2007 |
| JP | 2008-76389 A | | 4/2008 |
| JP | 2009211681 A | * | 9/2009 |
| JP | 2009-236517 A | | 10/2009 |
| JP | 2010-151725 A | | 7/2010 |
| JP | 4905054 B2 | * | 3/2012 |
| JP | 2014-119314 A | | 6/2014 |
| JP | 5673071 B2 | | 2/2015 |
| KR | 20130047159 A | * | 5/2013 |
| WO | WO 2010/073113 A1 | | 7/2010 |

OTHER PUBLICATIONS

English Translation of JP 4905054 B2 (Year: 2021).*
English Translation of CN 102540228 A (Year: 2021).*
English Translation of KR 20130047159 A (Year: 2021).*
International Search Report issued in PCT/JP2017/003142 (PCT/ISA/210), dated Apr. 25, 2017.
Japanese Decision of Refusal for Japanese Application No. 2018-564068, dated Dec. 8, 2020, with English translation.
Japanese Office Action for Japanese Application No. 2018-564068, dated Apr. 7, 2020, with an English translation.

* cited by examiner

> GNSS POSITION
----> MOVEMENT DIRECTION OF GNSS POSITION
——> GNSS AZIMUTH

> GNSS POSITION
----> MOVEMENT DIRECTION OF GNSS POSITION
——> GNSS AZIMUTH
▷ DR POSITION
——▶ DR AZIMUTH

——— RANGE RATE CONVERTED FROM DOPPLER FREQUENCY
----- RANGE RATE CALCULATED FROM POSITIONING RESULT OF DEAD RECKONING

▶ GNSS POSITION IN HISTORY   ▷ DR POSITION IN HISTORY

▷ DR POSITION IN HISTORY
  (AFTER REPLICATION AND AFFINE TRANSFORMATION)

▶ GNSS POSITION IN HISTORY

● DR POSITION IN HISTORY

○ DR POSITION IN HISTORY
  (AFTER REPLICATION, AFFINE TRANSFORMATION)

F I G . 1 2
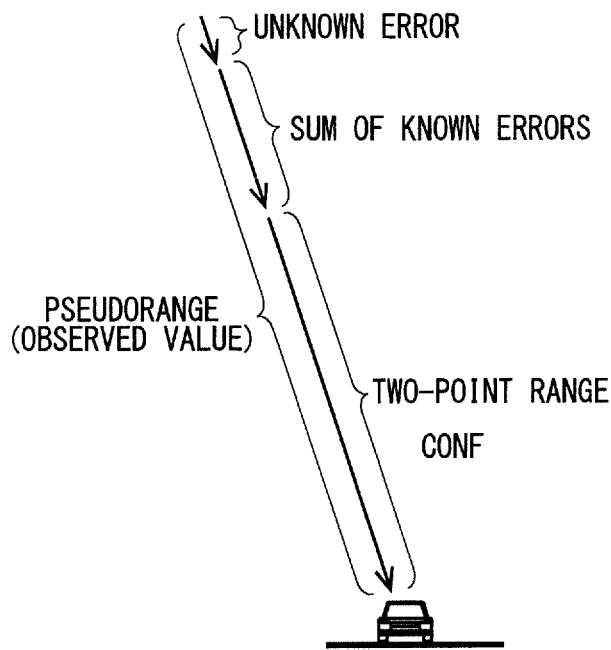
F I G . 1 3
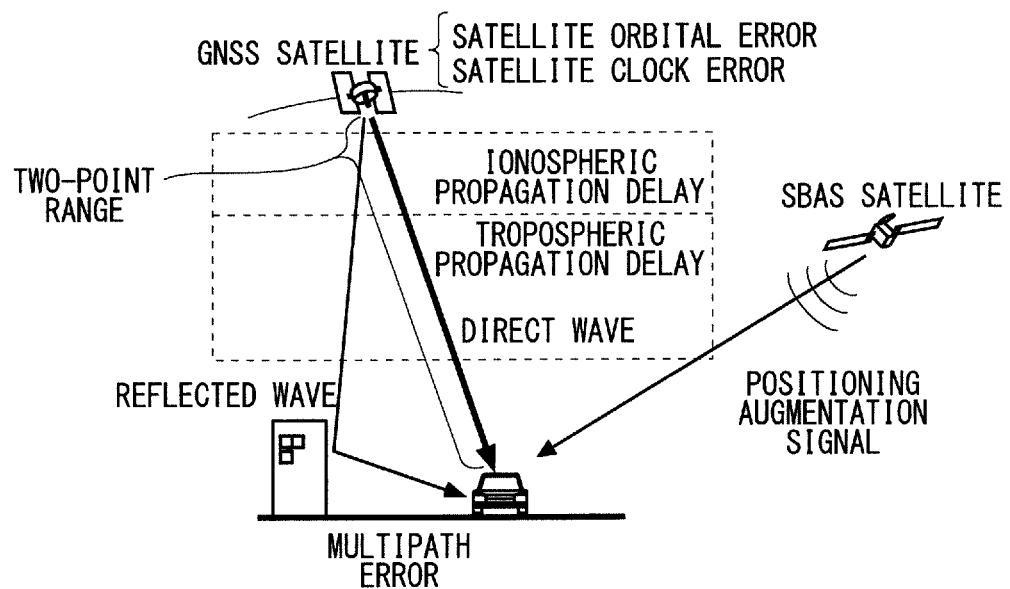

FIG. 17

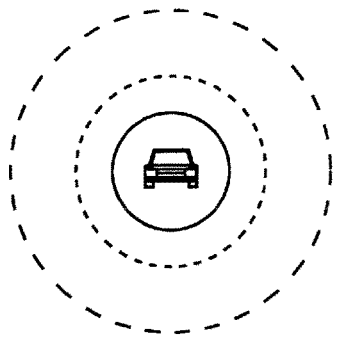

( ) CIRCLE INDICATING ERROR IN POSITIONING USING PSEUDORANGE OBSERVED VALUE ( ) CIRCLE INDICATING ERROR IN POSITIONING USING PSEUDORANGE
   OBSERVED VALUE CORRECTED BASED ON POSITIONING AUGMENTATION SIGNAL

◯ CIRCLE INDICATING ERROR IN POSITIONING USING PSEUDORANGE
   SMOOTHED VALUE CORRECTED BASED ON POSITIONING AUGMENTATION SIGNAL

FIG. 18

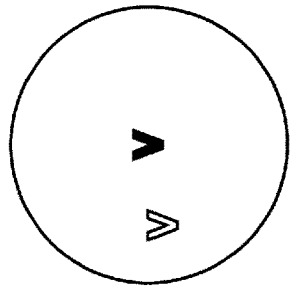

▶ GNSS POSITION

◯ PREDICTED ERROR IN POSITIONING
   OF MULTI-GNSS RECEIVE

▷ GNSS-KF SOLUTION POSITION

FIG. 19

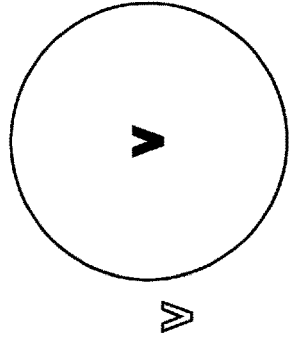

▶ GNSS POSITION

◯ PREDICTED ERROR IN POSITIONING
   OF MULTI-GNSS RECEIVE

▷ GNSS-KF SOLUTION POSITION

POSITIONING DEVICE AND POSITIONING METHOD

TECHNICAL FIELD

The present invention relates to a positioning device (locator device) that conducts positioning with lane-level precision with use of a global navigation satellite system (GNSS) receiver or the like, and to a positioning method.

BACKGROUND ART

A typical car navigation device observes and measures the motion of a vehicle (hereinafter referred to as a "subject vehicle") equipped with the car navigation device using a GNSS receiver and an autonomous sensor to estimate the position of the subject vehicle. Further, such a car navigation device identifies the position of the subject vehicle on a road through map matching processing using map data, and then, for example, displays a map showing the position of the subject vehicle, and conducts route guidance. Car navigation devices of the related art each use map data in which each road is represented as one link. Hence, positioning precision required for the GNSS receiver is such a degree as to allow a traveling road to be identified (positioning precision of several meters under open sky). For this reason, low-cost on-vehicle GNSS receivers have been used.

However, in recent years, as a result of enhancement in performance of car navigation devices, an increase in resolution of map information, development of automated driving technologies, and the like, there have been required technologies of estimating a position of a subject vehicle with lane-level precision. In order to estimate the position of the subject vehicle with lane-level precision, it is required that GNSS positioning be increased in precision, and particularly in an environment where multipath (a phenomenon where a radio wave from a GNSS satellite is reflected from, for example, buildings around a road and then received by a GNSS antenna) occurs, a subject vehicle position estimation technology that reliably prevents a decrease in precision is required. In order to realize such a subject vehicle position estimation technology, the following technology is required. Note that in the following description, the GNSS satellite is sometimes simply referred to as a "satellite", and the radio wave emitted by the GNSS satellite is sometimes referred to as a "satellite radio wave".

Such a low-cost on-vehicle GNSS receiver uses code positioning in which a two-point range between the GNSS satellite and the subject vehicle is determined from a propagation time of the radio wave emitted by the GNSS satellite, and the position of the subject vehicle and a receiver clock error are determined based on the principle of triangulation (the two-point range between the GNSS satellite and the subject vehicle determined from the propagation time of the radio wave is referred to as a "pseudorange"). However, in a multipath environment, the GNSS receiver fails to correctly observe the propagation time of the radio wave, which causes a positioning error (a positioning error caused by the multipath is referred to as a "multipath error"). The occurrence of this problem can be suppressed by an increase in opportunity to use satellites having high elevation angles that are less liable to cause multipath, which leads to increased use of multi-GNSS receivers on vehicles that support a plurality of positioning satellite systems (e.g., global positioning system (GPS), quasi-zenith satellite system (QZSS), global navigation satellite system (GLONASS), BeiDou navigation satellite system (BeiDou), Galileo, etc.).

However, even with such a multi-GNSS receiver, the multipath problem is not completely eliminated. Therefore, in addition to the use of the multi-GNSS receiver, it is required that a system-on-a-chip (SoC) estimate the multipath error from Raw data acquired from various GNSS satellites and conduct positioning calculation to suppress a decrease in positioning precision. The configuration where the SoC conducts the positioning calculation requires the SoC to comply with respective specifications of Raw data of GNSSs and cope with differences among time systems of the GNSSs. Further, when the SoC handles only GPS Raw data, the number of satellites used for positioning (positioning-use satellites) is less than the number of satellites supported by the multi-GNSS receiver, which becomes a disadvantage. Therefore, it is necessary to compensate for the disadvantage.

On the other hand, in the following Patent Document 1, proposed is a technology of suppressing a decrease in positioning precision in a multipath environment. In the technology disclosed in Patent Document 1, in order to determine the position of the subject vehicle with high precision even under a condition where there are variations in GPS positioning precision among epochs (positioning periods of a GPS receiver), a locus of the subject vehicle is calculated by integrating, for the duration of predetermined periods, a velocity vector calculated using a Doppler frequency. Then, with respect to a plurality of points constituting the locus of the position of the subject vehicle, movement parallel to the locus of the position of the subject vehicle so as to minimize a difference between a geometrical two-point range between the position of the subject vehicle on the locus and a position of the GNSS satellite and the pseudorange is made and then the position of the subject vehicle is calculated. This technology allows an azimuth (traveling direction) of the subject vehicle to be determined from the locus that results from integrating the velocity vector, which eliminates the need for a parameter for the azimuth and makes it possible to easily calculate the position of the subject vehicle. Further, the use of the velocity vector allows continuous calculations of the locus even under a condition where the number of positioning-use satellites is insufficient, which makes it possible to estimate the position of the subject vehicle with precision of an error of several meters.

Further, in the following Patent Document 2, proposed is a technology in which with regard to GPS positioning for smoothing variations in GPS positioning using a Kalman filter (KF) method, even when the positioning precision immediately after passing through a tunnel is low, the state where the positioning precision is low is prevented from continuing. In the technology disclosed in Patent Document 2, a first range in which the position of the subject vehicle may exist in the current epoch is set, and a second range in which the position of the subject vehicle may exist in a past epoch in which the positioning is resumed after passing through the tunnel is set based on the first range. The first range is calculated based on an error covariance matrix and a pseudorange error determined from dilution of precision (DOP) determined by an arrangement of GPS satellites. The second range may result from shifting the first range based on the azimuth and the velocity of the subject vehicle in the current epoch. When the position of the subject vehicle measured in the past epoch in which the positioning is resumed after passing through the tunnel is not included in the second range, in a calculation using the Kalman filter in the next epoch, disuse of the position of the subject vehicle in the past epoch prevents the state where the positioning precision is low from continuing.

PRIOR ART DOCUMENTS

Patent Documents

Patent Document 1: Japanese Patent No. 5673071
Patent Document 2: Japanese Patent Application Laid-Open No. 2009-236517

SUMMARY

Problem to be Solved by the Invention (1) Suppression of Decrease in Positioning Precision in Multipath Environment One of the challenges to be solved by the present invention is to suppress a decrease in precision in the multipath environment and to secure lane-level precision. When multipath occurs with respect to a specific satellite radio wave, and the SoC fails to correctly recognize a decrease in positioning precision due to a multipath error, a problem arises that the position of the subject vehicle is erroneously corrected. In order to solve this problem, the SoC may conduct complex positioning for determining an error in the position of the subject vehicle from Raw data of the GNSS receiver. When positioning-use satellites include at least one satellite that has caused multipath, an error arises in the position of the subject vehicle determined by complex positioning, which makes it necessary to remove the satellite that has caused the multipath from the positioning-use satellites or to accurately determine and correct the multipath error in the pseudorange.

With the technology disclosed in Patent Document 1, a least squares method (LS method) is used for positioning calculation, but since the least squares method is based on the premise that the error has randomness, it is necessary to remove a point where a large error or a biased error arises in the pseudorange or the like. Even when the pseudorange containing the multipath error is used for positioning calculation, it is necessary to determine a locus length of the position of the subject vehicle so as to secure randomness. However, the occurrence of multipath varies with location and time, and a locally biased error may continue to arise, which makes it difficult to determine the length of the locus. In a high-rise building area or the like where a decrease in precision of the position of the subject vehicle is more liable to occur, the randomness in error cannot be secured, and the precision in position of the subject vehicle does not reach the lane level.

The technology disclosed in Patent Document 2 supports only a section where positioning is resumed immediately after the subject vehicle comes out of a tunnel, and does not support a case where a large error remains in a value estimated using the Kalman filter in a section where multipath occurs. Further, even when an arrangement (DOP) of the positioning-use satellites over the subject vehicle is suitable, it is not necessarily true that there is no influence of multipath. Furthermore, a case where positioning precision in a past epoch is good and positioning precision in the current epoch is poor, and positioning precision remains low from an exit of the tunnel up to the current epoch generates a concern that internal data of the Kalman filter may be erroneously corrected with a GPS position in the current epoch in which positioning precision is poor, which makes it difficult to sufficiently suppress a decrease in positioning precision in the multipath environment.

(2) Reduction in Calculation Load when Multi-GNSS Receiver is Used

When GNSS positioning is conducted using Raw data of a multi-GNSS receiver or a dual-frequency GPS receiver, the number of positioning-use satellites increases, which simply increases computational complexity of matrix calculation. When any of the positioning-use satellites includes Raw data affected by multipath, the number of convergence calculations in each epoch increases, which causes a problem of an increase in calculation load. In Patent Document 1 or 2, no countermeasure against this problem is described.

The present invention has been made to solve the problems described above, and has an object to provide a positioning device capable of achieving high positioning precision and reducing a calculation load in each epoch.

Means to Solve the Problem

A positioning device according to the present invention includes a global navigation satellite system (GNSS) receiver configured to output a position, a velocity, and an azimuth of a subject vehicle, Raw data, and a positioning augmentation signal, the position, the velocity, and the azimuth of the subject vehicle being calculated from a radio wave received from a GNSS satellite and the positioning augmentation signal received from a positioning augmentation satellite, the Raw data being extracted from the radio wave of the GNSS satellite, a dead reckoning (DR) part configured to calculate a position of the subject vehicle by dead reckoning, a pseudorange smoothing part configured to smooth a pseudorange between the GNSS satellite and the position of the subject vehicle using a carrier wave phase included in the Raw data, a GNSS receiver positioning error evaluation part configured to evaluate reliability of the position of the subject vehicle calculated by the GNSS receiver, a GNSS positioning part configured to calculate a position of the subject vehicle from a smoothed value of the pseudorange, the positioning augmentation signal, and an orbit of the GNSS satellite, and a complex positioning part configured to calculate an error in the dead reckoning conducted by the dead reckoning part from the position of the subject vehicle calculated by the GNSS positioning part and to correct the position of the subject vehicle calculated by the dead reckoning part based on the error in the dead reckoning.

Effects of the Invention

The complex positioning part calculates the error in the dead reckoning and corrects the position of the subject vehicle calculated by the dead reckoning part, thereby providing high positioning precision. Further, executing positioning processing in a distributed manner suppresses a calculation load. Further, when the positioning processing is executed in a distributed manner, it is easy to obtain only one of the position and the azimuth of the subject vehicle or to confirm each error in the middle of the positioning processing, which leads to an increase in robustness of positioning.

The objects, features, aspects, and advantages of the present invention will become more apparent from the following detailed description and the accompanying drawings.

BRIEF DESCRIPTION OF DRAWINGS

FIG. 12 is a diagram illustrating processing of evaluating an error in Raw data (pseudorange) and selecting a positioning-use satellite.

FIG. 13 is a diagram illustrating the processing of evaluating an error in Raw data (pseudorange) and selecting a positioning-use satellite.

FIG. 17 is a diagram illustrating the processing of evaluating an error in Raw data (pseudorange) and selecting a positioning-use satellite.

FIG. 18 is a diagram illustrating a method of determining validity of a GNSS-KF solution position.

FIG. 19 is a diagram illustrating the method of determining validity of a GNSS-KF solution position.

Figure 1:
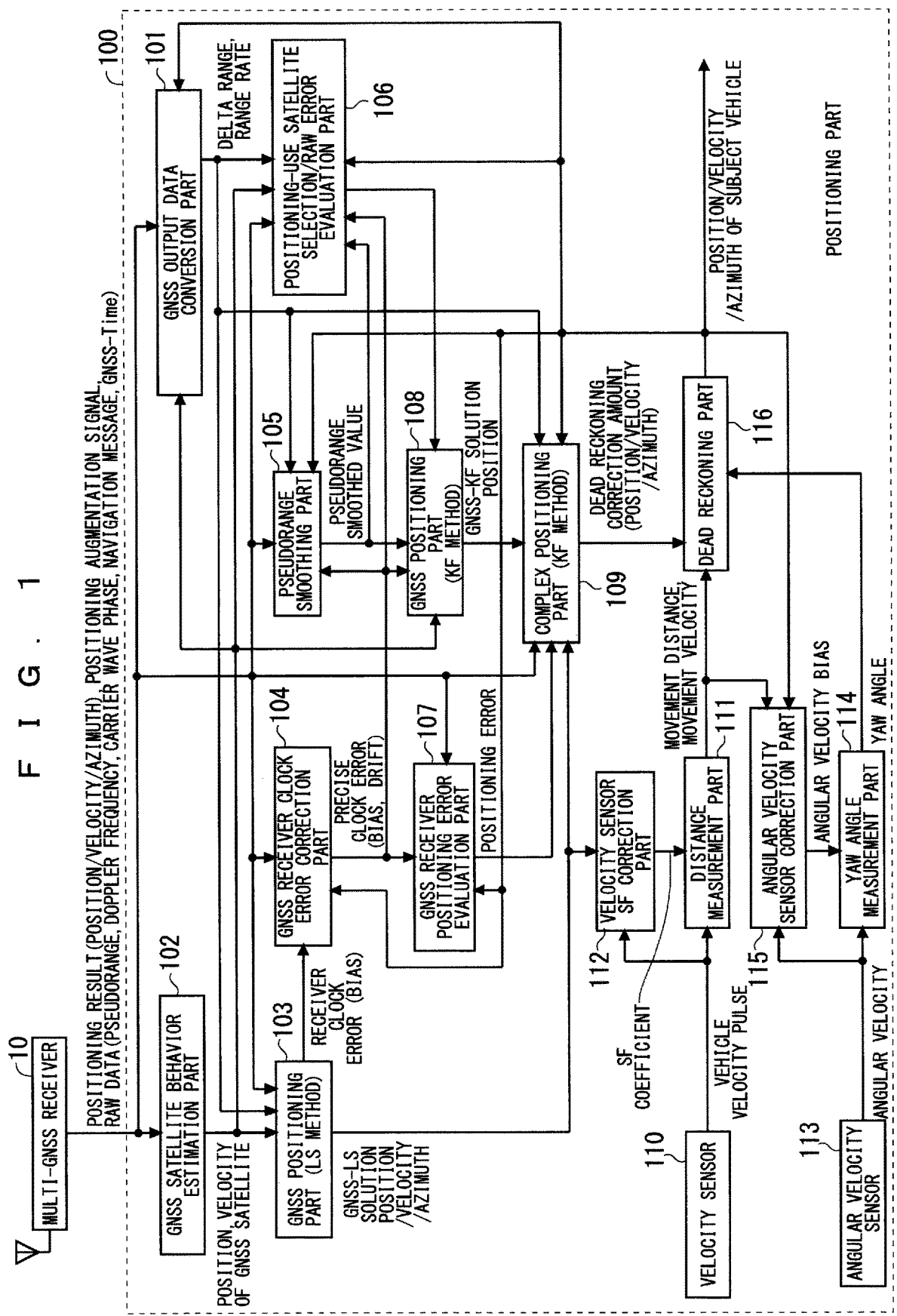
FIG. 1 is a block diagram showing a configuration of a locator device according to a first embodiment.

DESCRIPTION OF EMBODIMENTS (1) Suppression of Decrease in Positioning Precision in Multipath Environment As described above, a low-cost on-vehicle GNSS receiver uses code positioning in which a two-point range between a GNSS satellite and a subject vehicle is determined from a propagation time of a radio wave emitted by the GNSS satellite, and a position of the subject vehicle and a receiver clock error are determined based on the principle of triangulation. However, in a multipath environment, the GNSS receiver fails to correctly observe the propagation time of the radio wave, which causes a positioning error such as a multipath error. The occurrence of this problem can be suppressed by an increase in opportunity to use satellites having high elevation angles that are less liable to cause multipath, which leads to increased use of multi-GNSS receivers on vehicles that support a plurality of positioning satellite systems.

However, even with such a multi-GNSS receiver, the multipath problem is not completely eliminated. Therefore, in addition to the use of the multi-GNSS receiver, it is required that an SoC estimate the multipath error from Raw data acquired from various GNSS satellites and conduct positioning calculation to suppress a decrease in positioning precision. The configuration where the SoC conducts the positioning calculation requires the SoC to comply with respective specifications of Raw data of GNSSs and cope with differences among time systems of the GNSSs. Further, when the SoC handles only GPS Raw data, the number of satellites used for positioning (positioning-use satellites) is less than the number of satellites supported by the multi-GNSS receiver, which becomes a disadvantage. Therefore, it is necessary to compensate for the disadvantage.

One of the challenges to be solved by the present invention is to suppress a decrease in precision in the multipath environment and to secure lane-level precision. When multipath occurs with respect to a specific satellite radio wave, and the SoC fails to correctly recognize a decrease in positioning precision due to a multipath error, a problem arises that the position of the subject vehicle is erroneously corrected. In order to solve this problem, the SoC may conduct complex positioning for determining an error in the position of the subject vehicle from Raw data of the GNSS receiver. When positioning-use satellites include at least one satellite that has caused multipath, an error arises in the position of the subject vehicle determined by complex positioning, which makes it necessary to remove the satellite that has caused the multipath from the positioning-use satellites or to accurately determine and correct the multipath error in the pseudorange.

In the technology disclosed in Patent Document 1, the least squares method is used for positioning calculation, but since the least squares method is based on the premise that the error has randomness, it is necessary to remove a point where a large error or a biased error arises in the pseudorange. Even when the pseudorange containing the multipath error is used for positioning calculation, it is necessary to determine a locus length of the position of the subject vehicle so as to secure randomness. However, the occurrence of multipath varies with location and time, and a locally biased error may continue to arise, which makes it difficult to determine the length of the locus. In a high-rise building area or the like where a decrease in precision of the position of the subject vehicle is more liable to occur, the randomness in error cannot be secured, and the precision in position of the subject vehicle does not reach the lane level.

The technology disclosed in Patent Document 2 supports only a section where positioning is resumed immediately after the subject vehicle comes out of a tunnel, and does not support a case where a large error remains in a value estimated using the Kalman filter in a section where multipath occurs. Further, even when an arrangement (DOP) of the positioning-use satellites over the subject vehicle is suitable, it is not necessarily true that there is no influence of multipath. Furthermore, a case where positioning precision in a past epoch is good and positioning precision in the current epoch is poor, and positioning precision remains low from an exit of the tunnel up to the current epoch generates a concern that internal data of the Kalman filter may be erroneously corrected with a GPS position in the current epoch in which positioning precision is poor, which makes it difficult to sufficiently suppress a decrease in positioning precision in the multipath environment.

(2) Increase in Precision of GNSS Receiver Using Carrier Wave Phase

A technology called precise point positioning (PPP) capable of increasing the positioning precision to about 1 m (circular error probability (CEP) of 50%) have been proposed. In PPP, an error in the pseudorange is corrected using positioning augmentation data (a satellite clock error, a satellite orbital error, an ionospheric propagation delay, and a tropospheric propagation delay) acquired from a satellite based augmentation system (SBAS) satellite, and smoothing (CS: carrier smoothing) of the pseudorange is conducted using the carrier wave phase. However, when the satellite radio wave is temporarily interrupted by a building or the like, a problem called "cycle slip" that prevents continuous use of the carrier wave phase arises. Therefore, it is necessary to correctly initialize the smoothed value of the pseudorange (pseudorange smoothed using the carrier wave phase) at the time of resuming reception of the satellite radio wave.

(3) Stabilization of Precision in Dead Reckoning by Sensor Learning

A low-cost on-vehicle autonomous sensor largely fluctuates in sensor zero point output and sensitivity. In order to conduct dead reckoning using such an autonomous sensor with a small position error, it is necessary to optimally conduct learning of the zero point output and the sensitivity of the autonomous sensor.

(4) Complex Positioning for Correcting Dead Reckoning Error

When determining the position error in the dead reckoning by complex positioning together with errors in the zero point output and sensitivity of the autonomous sensor, the number of parameters representing state quantities of the complex positioning increases, which generates a concern that the matrix calculation increases. When positioning calculation is conducted with a low-cost SoC, it is also necessary to suppress a calculation load.

(5) Suppression of Decrease in Positioning Precision Due to Restriction of Visibility Over Subject Vehicle In a state where visibility over the subject vehicle is restricted, the number of positioning-use satellites decreases, or the positioning-use satellites are positioned unevenly in a specific direction, which makes geometry of the positioning-use satellites deteriorate and thus leads to a decrease in positioning precision. Further, even under open sky, the number of positioning-use satellites may decrease, or the positioning-use satellites may be positioned unevenly in a specific direction. It is desired that such a decrease in positioning precision be suppressed.

With the technology disclosed in Patent Document 1, the least squares method is used for positioning calculation, but it is difficult to determine the length of the locus so as to secure the randomness in error in a state where the satellites are positioned unevenly in a specific direction. Further, at the exit of the tunnel, the number of satellites from which the GNSS receiver has acquired radio waves is small, which leads to a state similar to a state where the visibility over the subject vehicle is restricted. This gives rise to a consideration of application of the technology disclosed in Patent Document 2, but even with the consideration, a case where positioning precision in a past epoch is good and positioning precision in the current epoch is poor, and positioning precision remains low from the exit of the tunnel up to the current epoch generates a concern that internal data of the Kalman filter may be erroneously corrected with a GPS position in the current epoch in which positioning precision is poor, which makes it difficult to sufficiently suppress a decrease in positioning precision.

(6) Suppression of Decrease in Positioning Precision by Dead Reckoning

In a loose coupling mode where an error in the dead reckoning is corrected using the positioning result of the GNSS receiver and a tight coupling mode where the error in the dead reckoning is calculated and corrected using the Raw data acquired by the GNSS receiver, in order to avoid erroneous correction of the position of the subject vehicle with lower positioning precision, the positioning method may be switched from the complex positioning to the dead reckoning as appropriate. However, when the dead reckoning is continued for a long time, the lane-level positioning precision cannot be maintained due to integrated error in the dead reckoning. In Patent Document 1, it is assumed that the complex positioning is conducted, but a countermeasure against this problem is not specified.

(7) Suppression of Decrease in Positioning Precision Due to Doppler Frequency Observation Error When a Doppler frequency observation error arises when the subject vehicle passes through an underpass, an error arises in the azimuth of the subject vehicle calculated from the Doppler frequency, and the calculated position of the subject vehicle may shift to a lane next to the actual traveling lane. Further, when the smoothing to suppress variations in the position of the subject vehicle measured by the GNSS receiver is strong, even under open sky, an error remains in the position of the subject vehicle measured by the GNSS receiver for a while afterward. Since the technologies disclosed in Patent Documents 1 and 2 are not intended to realize the lane-level positioning precision, no countermeasure against this problem is specified in Patent Document 1 or 2.

(8) Suppression of Decrease in Precision Immediately after Reception of Satellite Radio Wave is Resumed When the pseudorange smoothed using the carrier wave phase is used for GNSS positioning, the pseudorange smoothed value cannot be updated while the satellite radio wave is interrupted, which causes the pseudorange smoothed value to be initialized with the pseudorange at the time when the reception of the satellite radio wave is resumed. When a pseudorange having a large error is used for this initialization, an error remains in the pseudorange smoothed value. When the error remains in the pseudorange smoothed value, even under open sky, an error in the position measured by GNSS positioning may become large, compared with a case where the pseudorange is not smoothed. In Patent Document 1 or 2, no countermeasure against this problem is described.

(9) Reduction of Calculation Load when Multi-GNSS Receiver is Used

When GNSS positioning is conducted using Raw data of a multi-GNSS receiver or a dual-frequency GPS receiver, the number of positioning-use satellites increases, which simply increases computational complexity of matrix calculation. When any of the positioning-use satellites includes Raw data affected by multipath, the number of convergence calculations in each epoch increases, which causes a problem of an increase in calculation load. In Patent Document 1 or 2, no countermeasure against this problem is described.

First Embodiment

FIG. 1 is a block diagram showing a configuration of a locator device according to a first embodiment of the present invention. FIG. 1 focuses on components of the locator device necessary for positioning of a vehicle (hereinafter referred to as a "subject vehicle") equipped with the locator device. As shown in FIG. 1, the locator device includes a multi-GNSS receiver 10 and a positioning part 100.

The multi-GNSS receiver 10 includes a multi-GNSS antenna capable of receiving radio waves radiated from a plurality of GNSS satellites positioned over the subject vehicle and radio waves broadcast from an SBAS satellite corresponding to a positioning augmentation satellite that broadcasts a positioning augmentation signal. It is assumed that the plurality of GNSS satellites include at least GPS satellites out of GPS, QZSS, GLONASS, BeiDou, and Galileo satellites, and the multi-GNSS receiver 10 receives at least L1 signals from the GPS satellites. The positioning augmentation signal contains respective pieces of correction information of a satellite clock error, a satellite orbital error, an ionospheric propagation delay, and a tropospheric propagation delay.

The multi-GNSS receiver 10 acquires Raw data (a pseudorange (observed value), a Doppler frequency, a carrier wave phase, a navigation message, GNSS-Time, etc.) necessary for positioning calculation from various satellite radio waves thus received, calculates a position, a velocity, an azimuth, and the like of the subject vehicle, and outputs the positioning result thus calculated (the position, the velocity, the azimuth, and the like of the subject vehicle), the Raw data, and the positioning augmentation signal to the positioning part 100. The position, the velocity, and the azimuth of the subject vehicle that correspond to the positioning result of the multi-GNSS receiver 10 are represented by a position in an Earth Centered Earth Fixed (ECEF) coordinate system, a movement amount of the position, and a movement direction of the position, respectively. Hereinafter, the position, the velocity, and the azimuth of the subject vehicle that correspond to the positioning result of the multi-GNSS receiver 10 are referred to as a "GNSS position", "GNSS velocity", and "GNSS azimuth", respectively.

The positioning part 100 includes, as components that conduct processing for GNSS positioning, a GNSS output data conversion part 101, a GNSS satellite behavior estimation part 102, a GNSS positioning part (LS method) 103, a GNSS receiver clock error correction part 104, a pseudorange smoothing part 105, a positioning-use satellite selection and Raw error evaluation part 106 (hereinafter referred to as a "positioning-use satellite selection/Raw error evaluation part 106"), a GNSS receiver positioning error evaluation part 107, and a GNSS positioning part (KF method) 108. The positioning part 100 further includes a complex positioning part (KF method) 109 as a component that conducts processing for complex positioning. The positioning part 100 still further includes, as components that conduct processing for dead reckoning, a velocity sensor 110, a distance measurement part 111, a velocity sensor SF correction part 112, an angular velocity sensor 113, a yaw angle measurement part 114, an angular velocity sensor correction part 115, and a dead reckoning part 116.

The GNSS output data conversion part 101 calculates a delta range that is a time differential value of the pseudorange included in the Raw data output from the multi-GNSS receiver 10 for each of the GNSS satellites from which the multi-GNSS receiver 10 has received radio waves. Further, the GNSS output data conversion part 101 converts the Doppler frequency and the carrier wave phase output from the multi-GNSS receiver 10 into respective range rates of the same unit [m/s] as the delta range.

The GNSS satellite behavior estimation part 102 calculates a position and a velocity of each of the GNSS satellites in GNSS-Time using the navigation message of the GNSS satellite and the positioning augmentation signal of the SBAS satellite output from the multi-GNSS receiver 10.

The GNSS positioning part (LS method) 103 calculates a position, a velocity, and an azimuth of the subject vehicle and a receiver clock error (bias error) of the multi-GNSS receiver 10 by least squares method using the position of the GNSS satellite calculated by the GNSS satellite behavior estimation part 102 and the pseudorange of each of the GNSS satellites received by the multi-GNSS receiver 10. Hereinafter, the position, the velocity, and the azimuth of the subject vehicle calculated by the GNSS positioning part (LS method) 103 are referred to as a "GNSS-LS solution position", "GNSS-LS solution velocity", and "GNSS-LS solution azimuth", respectively.

The GNSS receiver clock error correction part 104 recalculates more precisely the receiver clock error calculated by the GNSS positioning part (LS method) 103. Hereinafter, the precise receiver clock error calculated by the GNSS receiver clock error correction part 104 is referred to as a "precise clock error".

The pseudorange smoothing part 105 smooths the pseudorange using the carrier wave phase of each of the satellites from which the multi-GNSS receiver 10 has received radio waves.

The positioning-use satellite selection/Raw error evaluation part 106 evaluates respective unknown errors in the pseudorange (observed value) included in the Raw data received from the multi-GNSS receiver 10 and the pseudorange smoothed value calculated by the pseudorange smoothing part 105, and selects, based on the evaluation result, a GNSS satellite and a pseudorange (observed value or smoothed value) to be used by the GNSS positioning part (LS method) 103 and the GNSS positioning part (KF method) 108 for positioning calculation.

The GNSS receiver positioning error evaluation part 107 evaluates an error in the positioning result of the multi-GNSS receiver 10 to determine whether the positioning result of the multi-GNSS receiver 10 is reliable.

The GNSS positioning part (KF method) 108 uses the positioning augmentation signal acquired from the SBAS satellite and the precise clock error (bias error and drift error) of the multi-GNSS receiver 10 calculated by the GNSS receiver clock error correction part 104 to correct various errors in the pseudorange or the pseudorange smoothed value to be used for positioning calculation, and then conducts, based on an orbit (position, velocity) of the satellite calculated by the GNSS satellite behavior estimation part 102, high precision positioning (PPP) for calculating the position of the subject vehicle by Kalman filter method.

The complex positioning part (KF method) 109 calculates, from the range rates calculated by the GNSS output data conversion part 101, an error (azimuth error) in the dead reckoning conducted by the dead reckoning part 116, and calculates, using the position of the subject vehicle calculated by the GNSS positioning part (KF method) 108, errors (position error and velocity error) in the dead reckoning conducted by the dead reckoning part 116.

The velocity sensor 110 outputs a pulse signal (vehicle velocity pulse) in accordance with a movement distance of the subject vehicle. The distance measurement part 111 measures the number of pulses output from the velocity sensor 110 at fixed intervals and calculates the movement distance and the velocity of the subject vehicle from the measured value. The velocity sensor SF correction part 112 calculates a scale factor (SF) coefficient representing a distance per pulse output from the velocity sensor 110 from the velocity of the subject vehicle calculated by GNSS positioning and the number of pulses of the velocity sensor 110, and corrects an SF coefficient set in the distance measurement part 111.

The angular velocity sensor 113 outputs a signal that results from adding a signal in accordance with an angular velocity (yaw rate) of the subject vehicle to a zero point output with reference to a vertical direction of a casing of the locator device as its sensor detection axis. The yaw angle measurement part 114 measures the output of the angular velocity sensor 113 at fixed intervals and calculates the yaw angle of the subject vehicle from the measurement result. The angular velocity sensor correction part 115 determines the zero point output of the angular velocity sensor 113 and corrects the zero point output of the angular velocity sensor 113 set in the yaw angle measurement part 114.

Note that the velocity sensor 110, the distance measurement part 111, the velocity sensor SF correction part 112, the angular velocity sensor 113, the yaw angle measurement part 114, and the angular velocity sensor correction part 115 are not necessarily provided in the locator device, and components that are mounted on the subject vehicle and have functions equivalent to the functions of the above-described components may be used.

The dead reckoning part 116 calculates and updates the position, the velocity, and the azimuth of the subject vehicle by the dead reckoning (DR) using the movement distance of the subject vehicle calculated by the distance measurement part 111 and the yaw angle of the subject vehicle calculated by the yaw angle measurement part 114. At this time, the dead reckoning part 116 corrects the position, the velocity, and the azimuth of the subject vehicle calculated by the dead reckoning, using the error in the dead reckoning calculated by the complex positioning part (KF method) 109. The position, the velocity, and the azimuth of the subject vehicle thus corrected are output from the locator device. Hereinafter, the position, the velocity, and the azimuth of the subject vehicle calculated by the dead reckoning part 116 are referred to as a "DR position", a "DR velocity", and a "DR azimuth", respectively.

Figure 2:
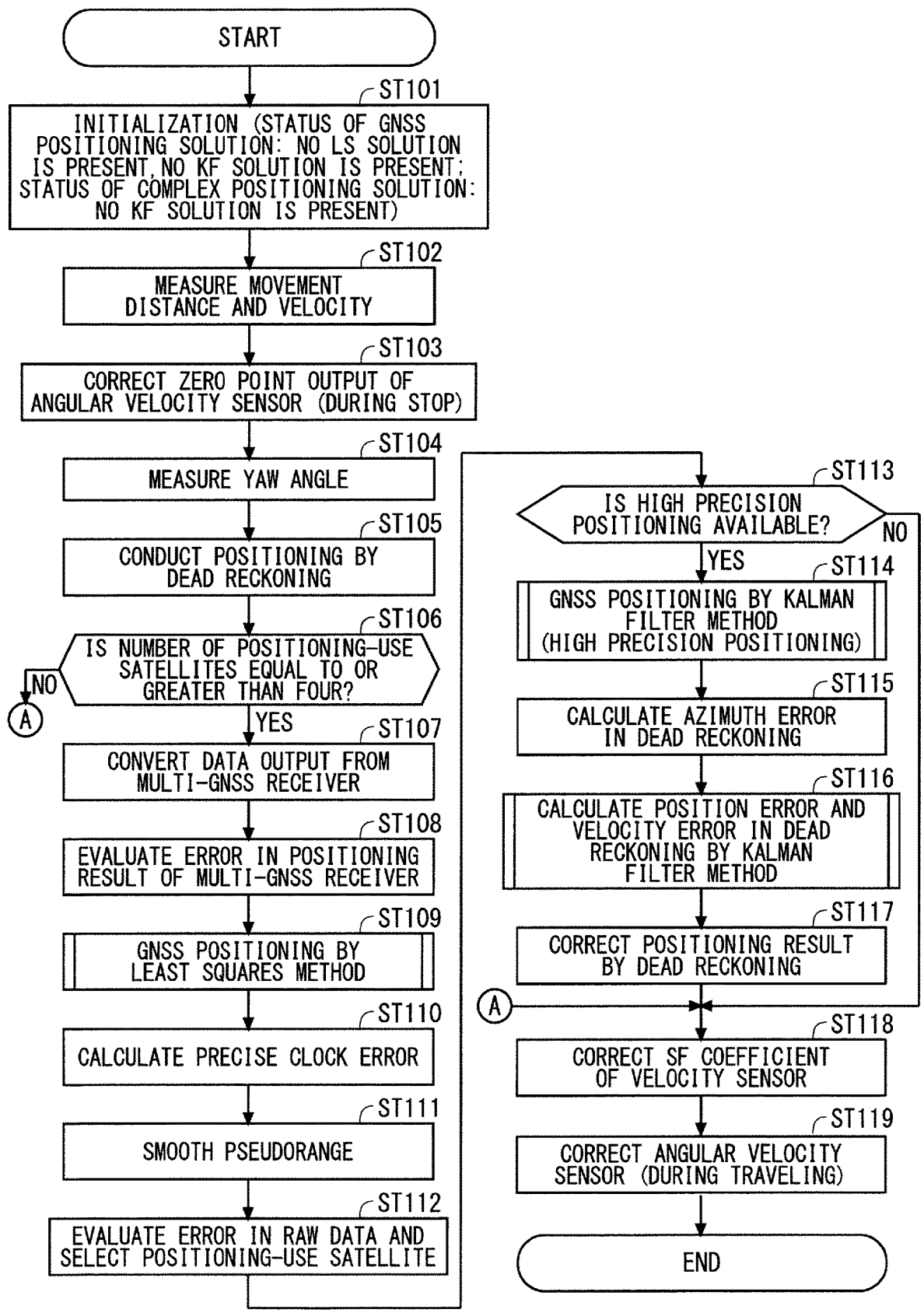
FIG. 2 is a flowchart showing main processing of a positioning part of the locator device according to the first embodiment.
Figure 3:
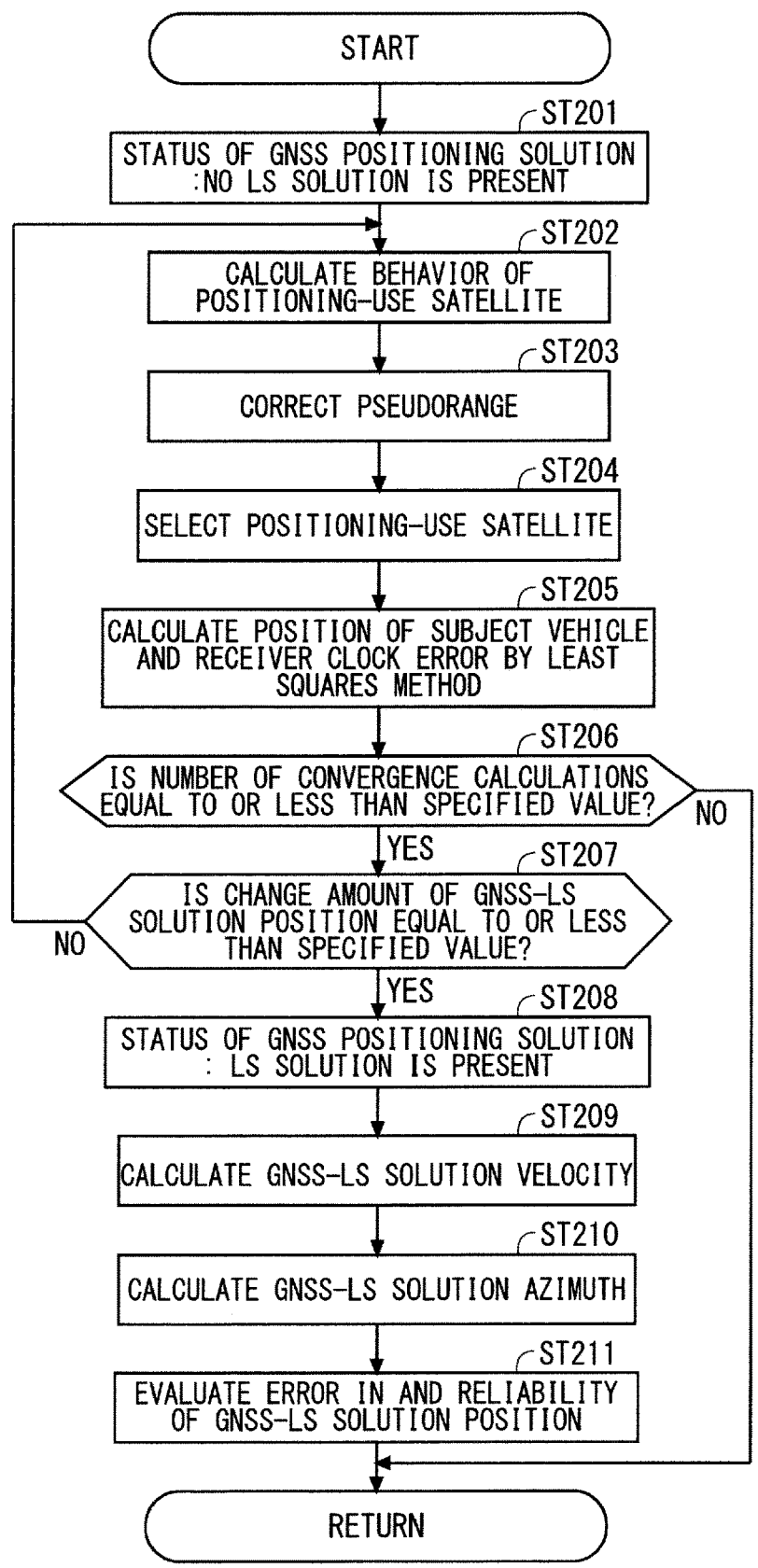
FIG. 3 is a flowchart showing a process of Step ST109 shown in FIG. 2.
Figure 4:
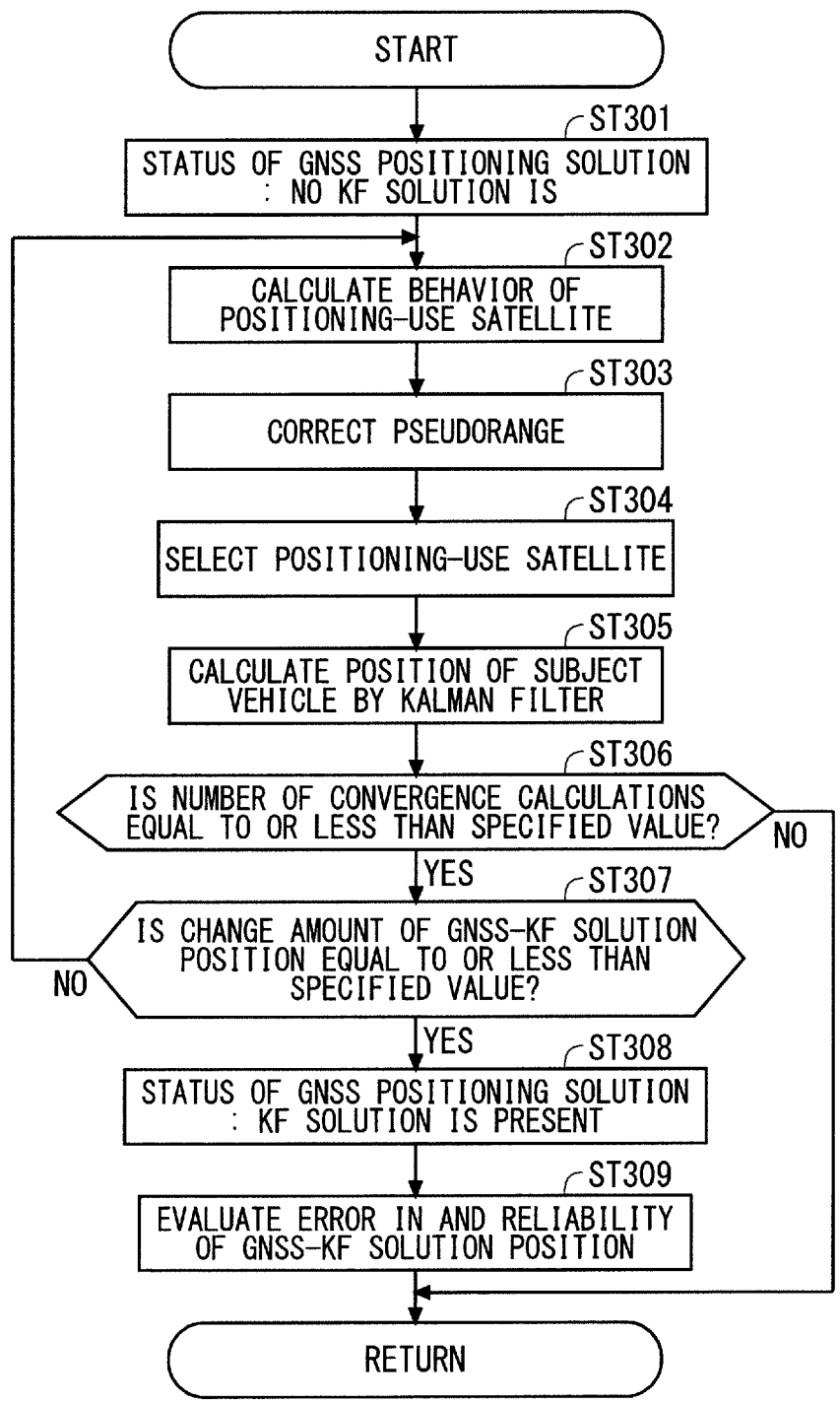
FIG. 4 is a flowchart showing a process of Step ST114 shown in FIG. 2.
Figure 5:
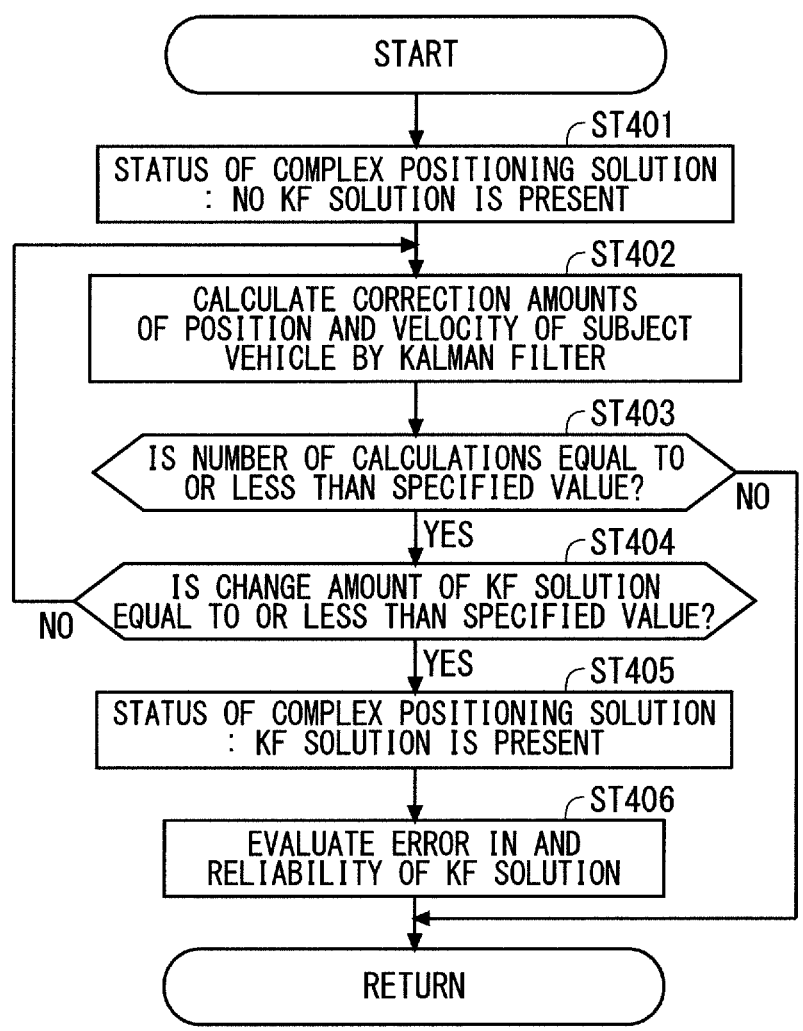
FIG. 5 is a flowchart showing a process of Step ST116 shown in FIG. 2.

Next, an operation of the locator device according to the first embodiment will be described. FIG. 2 is a flowchart showing main processing of the positioning part 100. FIGS. 3 to 5 are flowcharts showing processing of the GNSS positioning part (LS method) 103, processing of the GNSS positioning part (KF method) 108, and processing of the complex positioning part (KF method) 109, respectively.

The flow shown in FIG. 2 is executed at predetermined intervals, and the flows shown in FIGS. 3 to 5 are executed in Steps ST109, ST114, and ST116 of the flow shown in FIG. 2, respectively. Hereinafter, the operation of the locator device according to the first embodiment will be described with reference to the flowcharts.

When the main processing shown in FIG. 2 is started, the positioning part 100 initializes the processing (Step ST101). This brings a status of a GNSS positioning solution set in the positioning part 100 into "no LS solution is present" and "no KF solution is present", and brings a status of a complex positioning solution into "no KF solution is present".

Subsequently, the processings of the following Steps ST102 to ST105 for the dead reckoning are executed.

In Step ST102, the distance measurement part 111 multiplies the number of pulses of the velocity sensor 110 measured at the fixed intervals by the SF coefficient to determine the movement distance of the subject vehicle, and uses a value that results from applying a low-pass filter to the number of pulses to calculate a movement velocity of the subject vehicle.

Step ST103 is a process to be executed while the vehicle is at a stop in which the angular velocity sensor correction part 115 corrects the zero point output of the angular velocity sensor 113. That is, when determining that the subject vehicle is at a stop from the movement distance of the subject vehicle calculated by the distance measurement part 111, the angular velocity sensor correction part 115 calculates a mean value of outputs of the angular velocity sensor 113 during the stop, and sets the mean value as the zero point output of the angular velocity sensor 113 to the yaw angle measurement part 114. Description has been given in detail of this process in Japanese Patent No. 3137784 and Japanese Patent No. 3751513 filed by the inventors of the present invention.

In Step ST104, the yaw angle measurement part 114 calculates the yaw angle that results from subtracting the zero point output from the output of the angular velocity sensor 113 measured at each predetermined timing.

In Step ST105, the dead reckoning part 116 conducts positioning of the position of the subject vehicle (DR position) by the dead reckoning. That is, the dead reckoning part 116 determines a movement vector (corresponding to the DR velocity and the DR azimuth) at predetermined intervals using the movement distance and the yaw angle of the subject vehicle calculated from output signals of the velocity sensor 110 and the angular velocity sensor 113, and adds the movement vector to a position of the subject vehicle previously calculated to update the position of the subject vehicle.

Next, the processings of the following Steps ST106 to ST119 for the GNSS positioning and the complex positioning are executed.

In Step ST106, the GNSS output data conversion part 101 confirms the number of GNSS satellites (positioning-use satellites) used by the multi-GNSS receiver 10 for the positioning at positioning timings of the multi-GNSS receiver 10. When the number of positioning-use satellites is equal or greater than four (YES in Step ST106), the processing proceeds to Step ST107. When the number of satellites is less than four (NO in Step ST106), the processing proceeds to Step ST118 (to be described later).

In Step ST107, the GNSS output data conversion part 101 conducts a conversion process on data output from the multi-GNSS receiver 10. Specifically, the GNSS output data conversion part 101 converts the pseudorange output from the multi-GNSS receiver 10 into a delta range that is a time differential value using Expression (1). Further, the GNSS output data conversion part 101 converts the Doppler frequency and the carrier wave phase output from the multi-GNSS receiver 10 into range rates of the same unit [m/s] as the delta range, using Expressions (2) and (3). Furthermore, the GNSS output data conversion part 101 calculates range rate predicted values of the GNSS satellite from the position and the velocity of the subject vehicle which the dead reckoning part 116 has calculated by the dead reckoning, using Expression (4). These processes are executed for each of the GNSS satellites from which the multi-GNSS receiver 10 has received radio waves.

$$\Delta\rho^i_{c\tau\_j} = \{\rho^i_{c\tau\_j} - \rho^i_{c\tau\_j-1}\}/\Delta t \qquad (1)$$

where $\Delta\rho^i_{c\tau\_j}$: a delta range of a satellite i in the current cycle j [m/s], $\rho^i_{c\tau\_j}$: a pseudorange output from the satellite i in the current cycle j [m], $\rho^i_{c\tau\_j-1}$: a pseudorange output from the satellite i in the previous cycle j−1 [m], and $\Delta t$: a cycle of positioning processing [s].

$$\Delta\rho^i_{rate\_j} = f_{dop\_j} \cdot C/F_{L1} \qquad (2)$$

where $\Delta\rho^i_{rate\_j}$: a range rate of the satellite i in the current cycle j (on a Doppler frequency basis)[m/s], $f_{dop\_j}$: a Doppler frequency output from the satellite i in the current cycle j [Hz], $f_{L1}$: a frequency of an L1 carrier wave [Hz], and C: the speed of light [m/s].

$$\Delta\rho^i_{\phi\_j} = (cp^i_{L1\_j} - cp^i_{L1\_j-1})\lambda_{L1}/\Delta t \qquad (3)$$

where $\Delta\rho^i_{\phi\_j}$: a range rate of the satellite i in the current cycle j (on a carrier wave phase basis) [m/s], $cp^i_{L1\_j}$: an integrated value of a carrier wave phase in an L1 band output from the satellite i in the current cycle j [cycles], $cp^i_{L1\_j-1}$: an integrated value of a carrier wave phase in the L1 band output from the satellite i in the previous cycle j−1 [cycles], and $\lambda_{L1}$: a wave length in the L1 band [m/cycles].

$$\begin{aligned}
\Delta\rho^i_{rate-s\_j} &= LOS^i_x \cdot v^i_{sx} + LOS^i_y \cdot v^i_{sy} + LOS^i_z \cdot v^i_{sz} \\
\Delta\rho^i_{rate-m\_j} &= LOS^i_x \cdot (v^i_{sx} - v_{0x}) + LOS^i_y \cdot \\
& \quad (v^i_{sy} - v_{0y}) + LOS^i_z \cdot (v^i_{sz} - v_{0z}) \\
LOS^i_{xj} &= (x_0 - x^i_s)/\|P^i_s - P_0\| \\
LOS^i_{yj} &= (y_0 - y^i_s)/\|P^i_s - P_0\| \\
LOS^i_{zj} &= (z_0 - z^i_s)/\|P^i_s - P_0\| \\
\|P^i_{s\_i} - P_0\| &= [(x^i_s - x_0)^2 + (y^i_s - y_0)^2 + (z^i_s - z_0)^2]^{1/2}
\end{aligned} \qquad (4)$$

where $\Delta\rho^i_{rate-s\_j}$: a predicted value of a range rate of the satellite i in the current cycle j (assuming the subject vehicle is at a stop) [m/s], $\Delta\rho^i_{rate-m\_j}$: a predicted value of a range rate of the satellite i in the current cycle j (assuming the subject vehicle is traveling) [m/s], $P^i_{s\_j}$: a position $(x^i_s, y^i_s, z^i_s)$ of the satellite i in the current cycle j [m], $V^i_s$: a velocity $(v^i_{sx}, v^i_{sy}, v^i_{sz})$ of the satellite i in the current cycle j [m/s], $P_{0\_j}$: a position $(x_0, y_0, z_0)$ of the subject vehicle in the current cycle j [m], $V_{0\_j}$: a velocity $(v_{0x}, v_{0y}, v_{0z})$ of the subject vehicle in the current cycle j [m/s], $\|P^s_i - P_0\|$: a range between the position of the satellite i and the position of the subject vehicle in the current cycle j [m], and $LOS^i_j$: a line of site vector when viewing the satellite i from the subject vehicle in the current cycle j.

Note that the delta range and the range rates determined by Expressions (1) and (2) are values before correction of the satellite clock error of the GNSS satellite and the receiver clock error of the multi-GNSS receiver 10, but the range rate predicted values determined by Expression (4) are values after correction of the errors.

Figure 6:
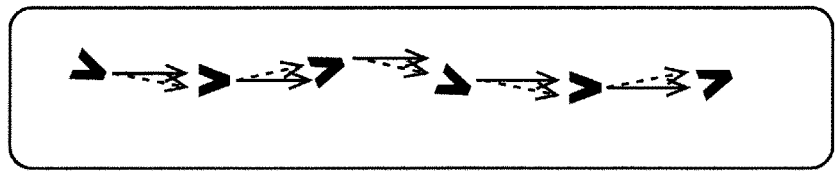
FIG. 6 is a diagram illustrating a method of evaluating an error in positioning (azimuth) of a multi-GNSS receiver.
Figure 7:
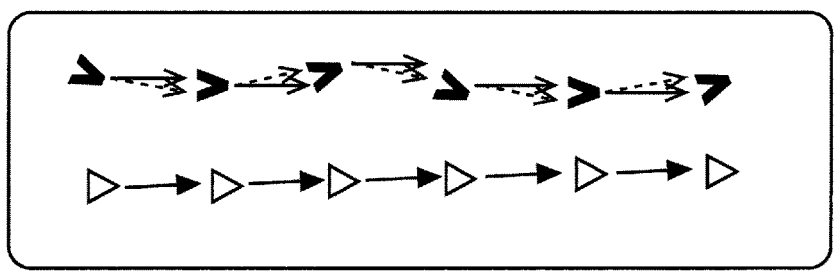
FIG. 7 is a diagram illustrating the method of evaluating an error in positioning (azimuth) of the multi-GNSS receiver.
Figure 8:
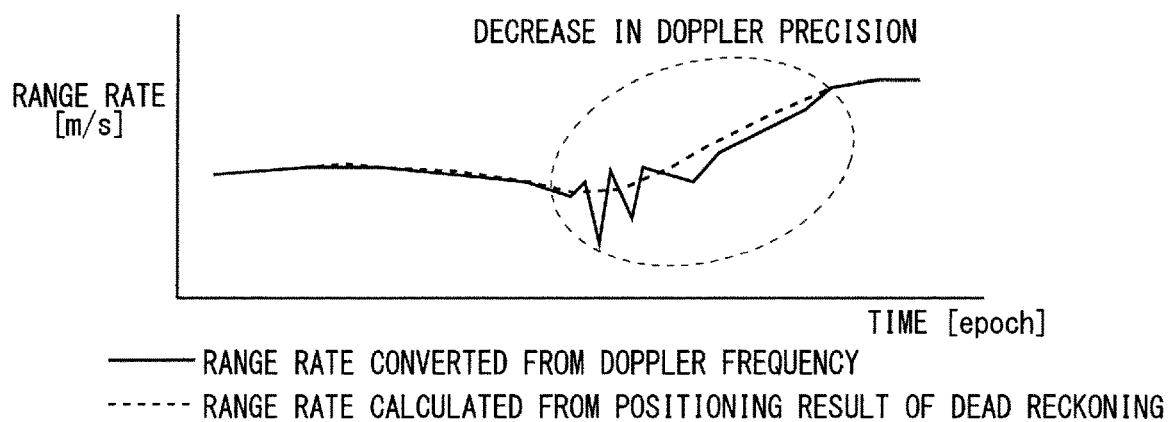
FIG. 8 is a diagram illustrating the method of evaluating an error in positioning (azimuth) of the multi-GNSS receiver.

In Step ST108, the GNSS receiver positioning error evaluation part 107 evaluates the error in the positioning result of the multi-GNSS receiver 10 and determines whether the positioning result of the multi-GNSS receiver 10 is reliable. Specifically, as shown in FIG. 6, the GNSS receiver positioning error evaluation part 107 compares the movement direction of the position of the subject vehicle (GNSS position) calculated by the multi-GNSS receiver 10 with the azimuth of the subject vehicle (GNSS azimuth) calculated by the multi-GNSS receiver 10 to estimate an error in the GNSS azimuth. As shown in FIG. 7, even when the DR azimuth calculated by the dead reckoning part 116 is constant, the GNSS azimuth calculated by the multi-GNSS receiver 10 tends to vary due to the influence of the error in the GNSS positioning. Further, as shown in FIG. 8, the GNSS receiver positioning error evaluation part 107 compares, for the Doppler frequency of each of the positioning-use satellites, a waveform of a range rate calculated from position information obtained by the dead reckoning with a waveform of a range rate that results from converting the Doppler frequency output from the multi-GNSS receiver 10 (that is, a range rate that results from correcting a receiver clock drift error).

As a result, when the GNSS azimuth error is equal to or less than a specified value, and the waveforms of the two range rates match each other for all the positioning-use satellites, the GNSS receiver positioning error evaluation part 107 determines that reliability of the GNSS azimuth is high. However, when the GNSS azimuth error is greater than the specified value, or when the waveforms of the two range rates do not match each other for any one of the positioning-use satellites, a determination is made that the reliability of the GNSS azimuth is low. Description has been given in detail of these processes in Japanese Patent No. 4988028 and Japanese Patent No. 5855249 filed by the inventors of the present invention.

Figure 9:
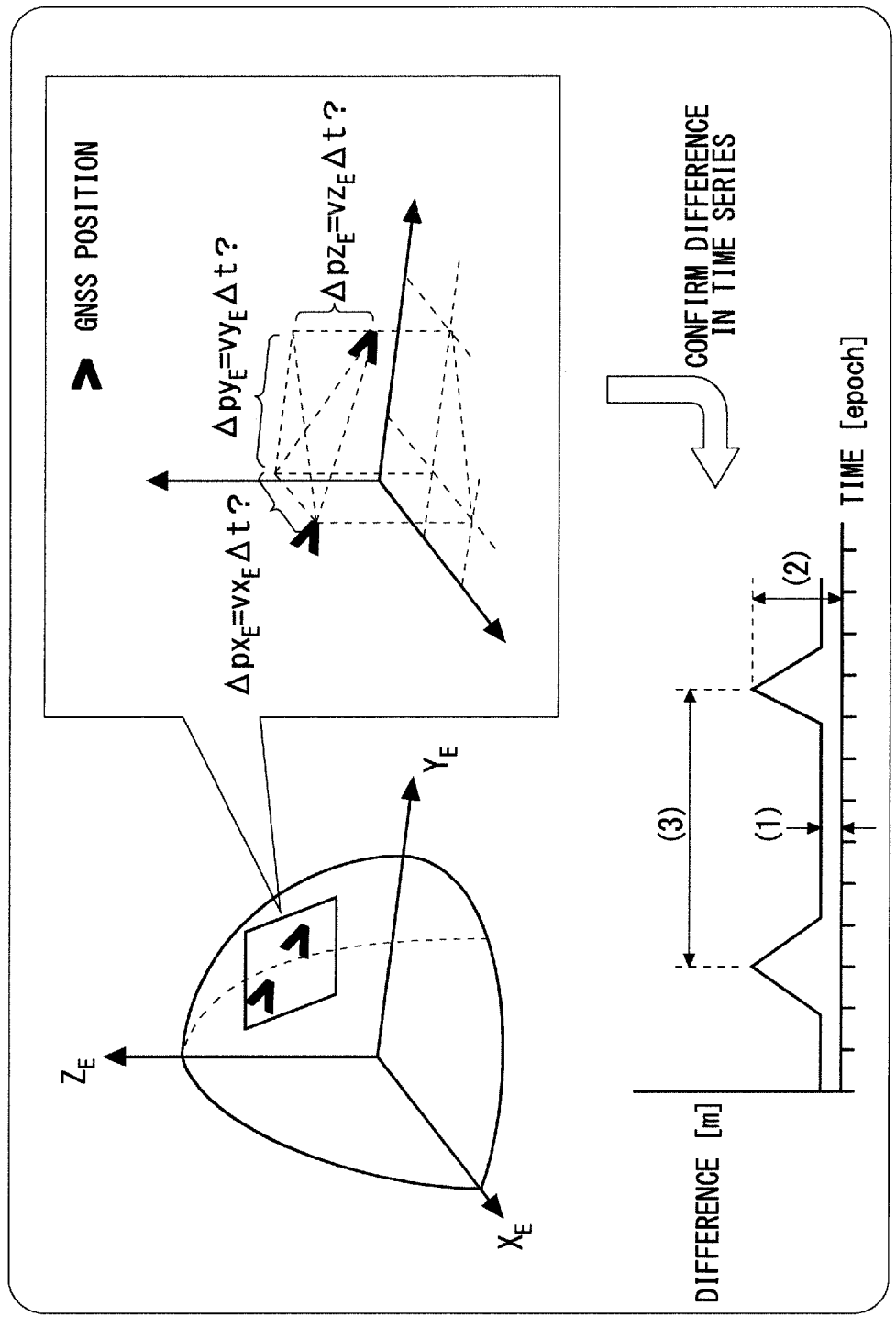
FIG. 9 is a diagram illustrating a method of evaluating an error in positioning (position) of the multi-GNSS receiver.

Further, as shown in FIG. 9, when the two range rates match each other, the GNSS receiver positioning error evaluation part 107 compares movement vectors ($\Delta px_E$, $\Delta py_E$, $\Delta py_E$) representing a change in the GNSS position between epochs with velocity vectors ($vx_E \Delta t$, $vy_E \Delta t$, $vz_E \Delta t$) representing the GNSS velocity and the GNSS azimuth to confirm a difference therebetween, and then estimates a relative error in the GNSS position measured by the multi-GNSS receiver 10. When all of (1), (2), and (3) shown in FIG. 9 are equal to or less than the specified value, the GNSS receiver positioning error evaluation part 107 determines that a relative position precision of the GNSS position is reliable, and when any one of (1), (2), and (3) is greater than the specified value, the GNSS receiver positioning error evaluation part 107 determines that the relative position precision of the GNSS position is unreliable.

Figure 10:
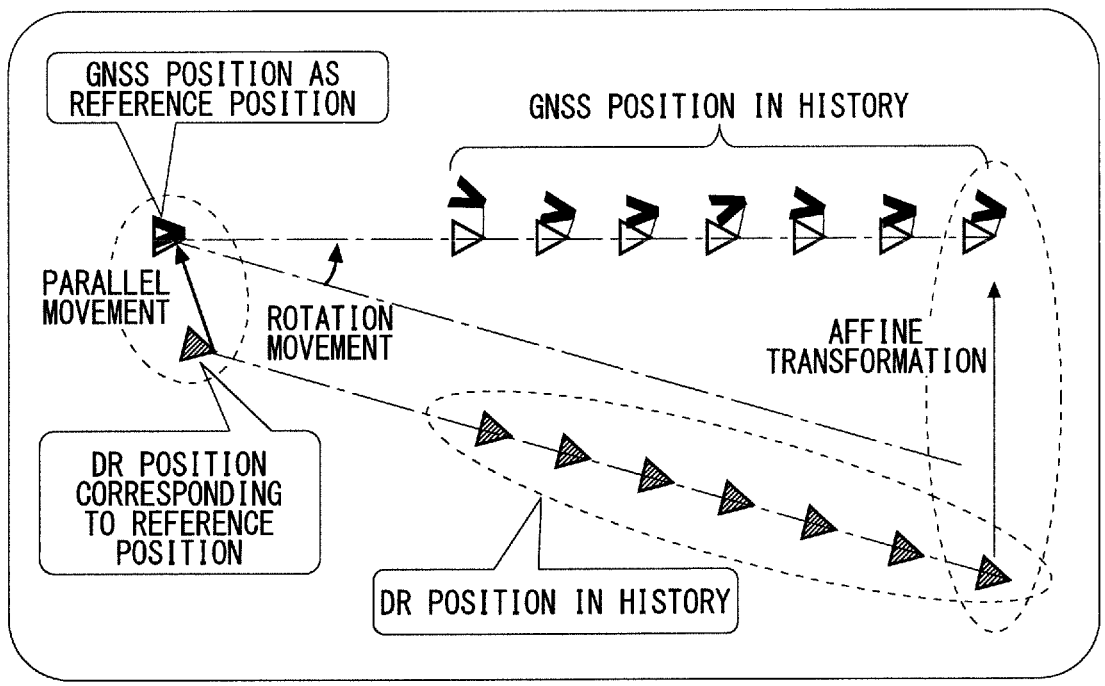
FIG. 10 is a diagram illustrating the method of evaluating an error in positioning (position) of the multi-GNSS receiver.
Figure 11:
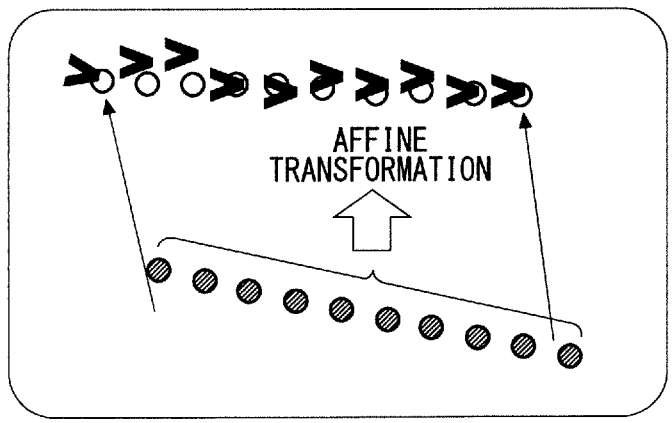
FIG. 11 is a diagram illustrating the method of evaluating an error in positioning (position) of the multi-GNSS receiver.

Further, as shown in FIG. 10 or 11, the GNSS receiver positioning error evaluation part 107 determines a locus of the GNSS position and a locus the DR position from a history of the GNSS position and a history of the DR position in latest predetermined epochs, compares the loci after affine transformation is conducted to make the loci match each other, and determines variations in difference between the GNSS position and the DR position at each position constituting the loci. Furthermore, the GNSS receiver positioning error evaluation part 107 estimates an absolute error in the GNSS position from the variations in difference between the GNSS position and the DR position, dilution of precision (DOP) determined by geometry of the GNSS satellites used by the multi-GNSS receiver 10 for positioning, and the like Description has been given in detail of this process in Japanese Patent No. 5855249 filed by the inventors of the present invention.

As a result, when the absolute error in the GNSS position is equal to or less than the specified value, and the relative position precision is reliable, the GNSS receiver positioning error evaluation part 107 determines that the absolute position of the GNSS position is reliable. However, when an absolute error of the GNSS position is greater than the specified value, or the relative position precision is unreliable, the GNSS receiver positioning error evaluation part 107 determines that the absolute position of the GNSS position is unreliable.

In Step ST109, the GNSS positioning part (LS method) 103 measures the position of the subject vehicle, that is, conducts the positioning of the subject vehicle, by the GNSS positioning using the least squares method. In this process, in addition to the position of the subject vehicle (GNSS-LS solution position), the velocity of the subject vehicle (GNSS-LS solution velocity), and the azimuth of the subject vehicle (GNSS-LS solution azimuth), the receiver clock error (bias error) of the multi-GNSS receiver 10 is also calculated. Description will be given below in detail of Step ST109 with reference to FIG. 3.

In Step ST110, the GNSS receiver clock error correction part 104 uses the receiver clock error (bias error) calculated by the GNSS positioning part (LS method) 103, the Raw data, and the like to calculate a more precise receiver clock error of the multi-GNSS receiver 10, that is, the precise clock error (bias error and drift error). Description has been given in detail of this process in International Application PCT/JP 2016/057337 filed by the inventors of the present invention.

In Step ST111, the pseudorange smoothing part 105 smooths the pseudorange using the carrier wave phase for each satellite from which the multi-GNSS receiver 10 has received radio waves. The smoothing of the pseudorange using the carrier wave phase is conducted using Expression (5).

$$\rho^i_{sm\_j} = [\{\rho^i_j + (\rho^i_{sm\_j-1} + \Delta\beta^i_{\varphi\_j}\Delta t) \cdot (M-1)\}]/M \quad (5)$$

where $\rho^i_{sm\_j}$: a smoothed value of a pseudorange of the satellite i in the current cycle j [m], $\rho^i_j$: an observed value of a pseudorange of the satellite i in the current cycle j [m], $\Delta\rho^i_{\varphi\_j}$: a range rate of the satellite i in the current cycle j (on a carrier wave phase basis) [m/s], and M: a weighted coefficient of Hatch filter (equal to or greater than two).

In Step ST112, the positioning-use satellite selection/Raw error evaluation part 106 evaluates respective unknown errors in the pseudorange (observed value) included in the Raw data received from the multi-GNSS receiver 10 and the pseudorange smoothed value calculated by the pseudorange smoothing part 105, and selects, based on the evaluation result, a GNSS satellite and a pseudorange (the observed value or the smoothed value) to be used by the GNSS positioning part (LS method) 103 for positioning calculation.

The positioning-use satellite selection/Raw error evaluation part 106 determines the unknown error in the pseudorange for each GNSS satellite from which the multi-GNSS receiver 10 has received radio waves. As shown in FIG. 12, the unknown error in the pseudorange is determined as a residual that results from subtracting a known error and a two-point range between the position of the GNSS satellite and the position of the subject vehicle (position of the subject vehicle (DR position) determined by the dead reckoning) from the pseudorange. As shown in FIG. 13, examples of the known error include a satellite orbital error, a satellite clock error, an ionospheric propagation delay error, a tropospheric propagation delay error, and the like calculated from the positioning augmentation signal of the SBAS satellite. Here, it is assumed that the precise clock error calculated by the GNSS receiver clock error correction part 104 is used as the satellite clock error. Note that a multipath error shown in FIG. 13 is included in the unknown error.

Further, the positioning-use satellite selection/Raw error evaluation part 106 also calculates, for the pseudorange smoothed value calculated by the pseudorange smoothing part 105, an unknown error that results from subtracting the known error from the pseudorange smoothed value.

Figure 14:
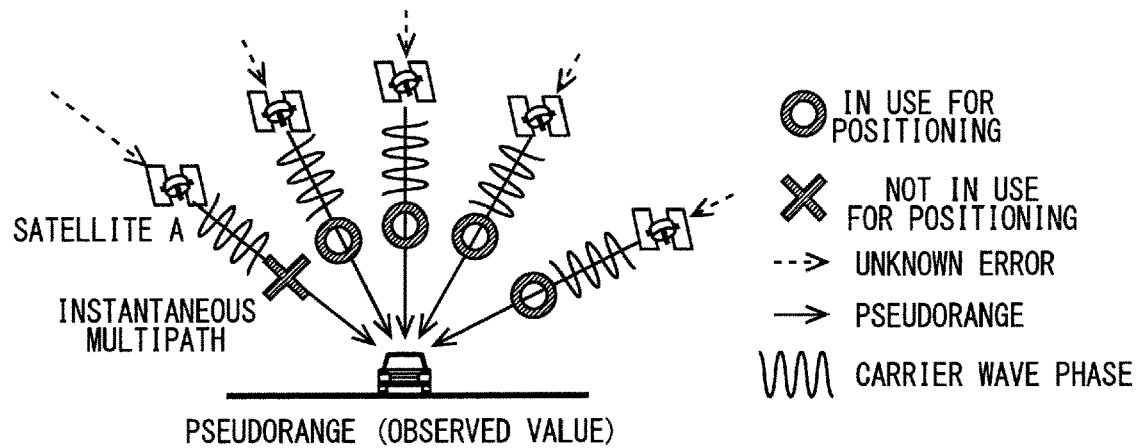
FIG. 14 is a diagram illustrating the processing of evaluating an error in Raw data (pseudorange) and selecting a positioning-use satellite.
Figure 15:
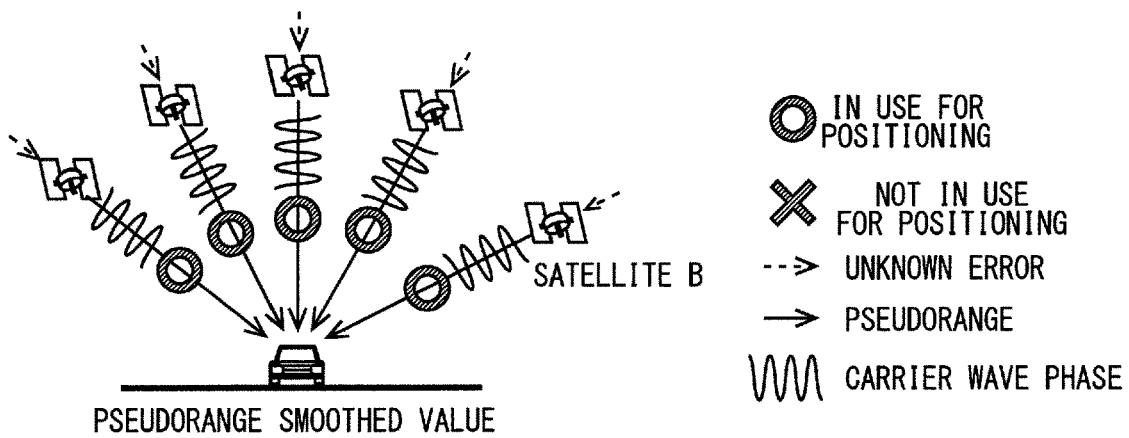
FIG. 15 is a diagram illustrating the processing of evaluating an error in Raw data (pseudorange) and selecting a positioning-use satellite.

Then, as shown in FIG. 14 or 15, the positioning-use satellite selection/Raw error evaluation part 106 selects, as positioning-use satellites, satellites that are equal to or less than a predetermined threshold value in unknown error in the observed value of the pseudorange (herein referred to as "pseudorange observed value") or the pseudorange smoothed value. In an example shown in FIG. 14, an instantaneous multipath with respect to a satellite A increases the unknown error in the pseudorange observed value, which removes the satellite A from the positioning-use satellites.

Figure 16:
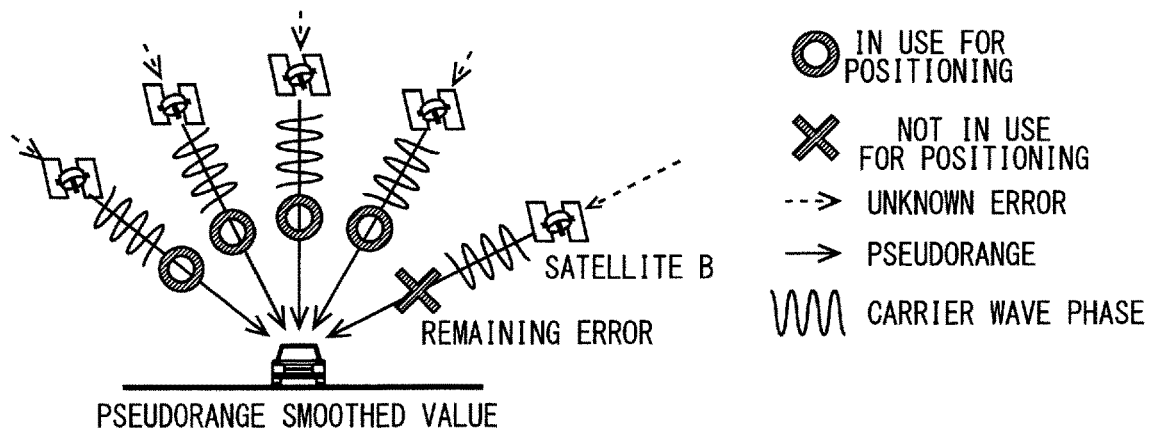
FIG. 16 is a diagram illustrating the processing of evaluating an error in Raw data (pseudorange) and selecting a positioning-use satellite.

Furthermore, the positioning-use satellite selection/Raw error evaluation part 106 selects one of the pseudorange observed value and the pseudorange smoothed value that is smaller in unknown error as the pseudorange of the positioning-use satellite. Normally, the pseudorange smoothed value becomes smaller in unknown error than the pseudorange observed value, but when the error remains in the pseudorange smoothed value immediately after an interruption of the satellite radio wave, as shown in FIG. 16, the pseudorange smoothed value may actually become larger in unknown error than the pseudorange observed value. In an example shown in FIG. 16, as a result of the error remaining in the pseudorange smoothed value of a satellite B, the unknown error in the pseudorange smoothed value of the satellite B increases, which removes the satellite B from the positioning-use satellites.

Step ST113 is a process for confirming in advance whether it is possible to conduct the high precision positioning (PPP). In Step ST113, the positioning-use satellite selection/Raw error evaluation part 106 confirms the number of satellites for which the pseudorange smoothed value is selected as the pseudorange among the selected positioning-use satellites, and determines whether the high precision positioning is possible based on the number. When the number of satellites for which the pseudorange smoothed value is selected as the pseudorange is equal to or greater than a specified value (specifically, four or more), a determination is made that the high precision positioning is possible (YES in Step ST113), and the processing proceeds to Step ST114. When the number of satellites for which the pseudorange smoothed value is selected as the pseudorange is less than the specified value, a determination is made that the high precision positioning is not possible (NO in Step ST113), and the processing proceeds to Step ST118 (to be described later). As shown in FIG. 17, positioning using the pseudorange smoothed value increases position precision.

In Step ST114, the GNSS positioning part (KF method) 108 conducts the high precision positioning (PPP) of the position of the subject vehicle by the GNSS positioning using the Kalman filter method. Description will be given below in detail of this process with reference to FIG. 4.

In Step ST115, the complex positioning part (KF method) 109 calculates an error in the azimuth (DR azimuth) of the subject vehicle calculated by the dead reckoning, using the GNSS-LS solution azimuth calculated in Step ST109. This process is executed when a determination is made that the GNSS azimuth is reliable in Step ST108 and a difference between the GNSS-LS solution azimuth calculated in Step ST109 and the GNSS azimuth output from the multi-GNSS receiver 10 is equal to or less than the specified value. Since the GNSS-LS solution azimuth is calculated from the Doppler frequency of the GNSS satellite and is not directly affected by multipath, it is possible to calculate the error in the DR azimuth stably.

In Step ST116, the complex positioning part (KF method) 109 calculates the error in the position (DR position) of the subject vehicle and the error in the velocity (DR velocity) of the subject vehicle by the Kalman filter method in which the observed value serves as the position calculated by the GNSS positioning to be referenced. Description will be given below in detail of this process with reference to FIG. 5.

In Step ST117, the dead reckoning part 116 uses the error in the dead reckoning (the respective errors in the DR position, the DR velocity, and the DR azimuth) calculated in Steps ST115 and ST116 to correct the positioning result (the DR position, the DR velocity, and the DR azimuth) obtained by the dead reckoning in Step ST105.

In Step ST118, the velocity sensor SF correction part 112 calculates the SF coefficient representing the distance per pulse output from the velocity sensor 110, and corrects the SF coefficient set in the distance measurement part 111. Description has been given in detail of this process in Japanese Patent No. 3321096, Japanese Patent No. 3727489, and Japanese Patent No. 5606656 filed by the inventors of the present invention.

Step ST119 is a process to be executed while the vehicle is traveling in which the angular velocity sensor correction part 115 corrects the zero point output of the angular velocity sensor 113. That is, the zero point output of the angular velocity sensor 113 that fluctuates due to a temperature drift while the vehicle is traveling is learned with reference to the azimuth (DR azimuth) of the subject vehicle, and the zero point output is corrected based on the learning result. Description has been given in detail of this process in Japanese Patent No. 3321096 and Japanese Patent No. 3727489 filed by the inventors of the present inventor. Note that a determination of whether the vehicle is traveling can be made from the movement distance of the subject vehicle calculated by the distance measurement part 111. When Step ST119 is completed, the flow shown in FIG. 2 comes to an end.

Next, description will be given in detail of Step ST109 shown in FIG. 2 with reference to FIG. 3. In Step ST109 shown in FIG. 2, the processings of Steps ST201 to ST211 shown in FIG. 3 are executed.

In Step ST201, the GNSS positioning part (LS method) 103 sets the status of the GNSS positioning solution set in the positioning part 100 to "no LS solution is present".

In Step ST202, the GNSS satellite behavior estimation part 102 uses the navigation message and the positioning augmentation signal (satellite orbital error) output from the multi-GNSS receiver 10 to calculate a behavior (position and velocity) of the positioning-use satellite in GNSS-Time. Note that GNSS-Time is calculated with accuracy gradually increasing during convergence calculation.

In Step ST203, the GNSS positioning part (LS method) 103 corrects the pseudorange output from the multi-GNSS receiver 10 to a value that results from subtracting various errors from the pseudorange using Expression (6). This process is executed for each satellite from which the multi-GNSS receiver 10 has received radio waves.

$$\rho^i_{ct'} = \rho^i_{ct} + dT^i_{sat} - dT_{rcv\text{-}bias} - d_{iono} - d_{trop} \qquad (6)$$

where $\rho^i_{ct'}$: a pseudorange of the satellite i that results from correcting a satellite clock error, an ionospheric propagation delay error, and a tropospheric propagation delay error [m], $dT^i_{sat}$: a satellite clock error in the satellite i [m], $dT_{rcv\text{-}bias}$: a bias error in a receiver clock [m], $d_{iono}$: an ionospheric radio wave propagation delay error [m], and $d_{trop}$: a tropospheric radio wave propagation delay error [m].

In Step ST204, the positioning-use satellite selection/Raw error evaluation part 106 selects the positioning-use satellite as in Step ST112 shown in FIG. 2.

In Step ST205, the GNSS positioning part (LS method) 103 calculates the position (GNSS-LS solution position) of the subject vehicle and the receiver clock error (bias error) using a calculation expression of the least squares method shown in Expression (7)

$$dP_0 = (A^T A)^{-1}(A^T) \times \begin{vmatrix} \rho^1_{ct'} - R^1 \\ \rho^2_{ct'} - R^2 \\ \vdots \\ \rho^n_{ct'} - R^n \end{vmatrix} \qquad (7)$$

$$P_0 = P_0 + dP_0$$

$$R^i = \left\{ (x^i_s - x_0)^2 + (y^i_s - y_0)^2 + (z^i_s - z_0)^2 \right\}^{1/2}$$

$$A = \begin{vmatrix} LOS^1_x & LOS^1_y & LOS^1_z & 1 \\ LOS^2_x & LOS^2_y & LOS^2_z & 1 \\ \vdots & \vdots & \vdots & \vdots \\ LOS^n_x & LOS^n_y & LOS^n_z & 1 \end{vmatrix}$$

$$LOS^i_x = (x_0 - x^i_s) / \|P^i_s - P_0\|$$

$$LOS^i_y = (y_0 - y^i_s) / \|P^i_s - P_0\|$$

$$LOS^i_z = (z_0 - z^i_s) / \|P^i_s - P_0\|$$

$$\|P^i_s - P_0\| = \left[ (x^i_s - x_0)^2 + (y^i_s - y_0)^2 + (z^i_s - z_0)^2 \right]^{1/2}$$

where $P^i_s$: a position ($x^i_s$, $y^i_s$, $z^i_s$) of the satellite [m], $P_0$: a position ($x_0$, $y_0$, $z_0$) of the subject vehicle [m], dP$_0$: a change amount (d$_{x0}$, d$_{y0}$, d$_{z0}$, T$_{rcv\text{-}drift}$) of the position of the subject vehicle [m],
A: dead reckoning,
n: the number of received satellites,
$\|P^i_s - P_0\|$: a range between the position of the satellite i and the position of the subject vehicle [m], and
LOS$^i$: a line of site vector (LOS$^i_x$, LOS$^i_y$, LOS$^i_z$) when viewing the satellite i from the subject vehicle.

In Step ST206, the GNSS positioning part (LS method) 103 confirms the number of convergence calculations in the current epoch. When the number of convergence calculations is equal to or less than a specified value (YES in Step ST206), the processing proceeds to Step ST207. When the number of convergence calculations is greater than the specified value (NO in Step ST206), a determination is made that convergence has failed, and the processing shown in FIG. 3 is terminated.

In Step ST207, the GNSS positioning part (LS method) 103 confirms the change amount of the GNSS-LS solution position in the current epoch. When the change amount of the GNSS-LS solution position is equal to or less than a specified value (YES in Step ST207), a determination is made that convergence has been achieved, and the processing proceeds to Step ST208. When the change amount of the GNSS-LS solution position is greater than the specified value (NO in Step ST207), a determination is made that convergence has failed, the time is updated, and the processing returns to Step ST202.

In Step ST208, the GNSS positioning part (LS method) 103 sets the status of the GNSS positioning solution to "LS solution is present".

In Step ST209, the GNSS positioning part (LS method) 103 calculates the velocity (GNSS-LS solution velocity) of the subject vehicle using Expression (8).

$$\Delta \rho^i_{rate'} = \Delta \rho^i_{rate} - C \cdot dT_{rev\text{-}drift} \qquad (8)$$

$$V_0 = (A^T A)^{-1} (A^T) \times \begin{vmatrix} \Delta \rho^1_{rate\text{-}s} - \Delta \rho^1_{rate'} \\ \Delta \rho^2_{rate\text{-}s} - \Delta \rho^2_{rate'} \\ \vdots \\ \Delta \rho^n_{rate\text{-}s} - \Delta \rho^n_{rate'} \end{vmatrix}$$

where
$\Delta \rho^i_{rate\text{-}s}$: a predicted value of a range rate of the satellite i (assuming the subject vehicle is at a stop) [m/s],
$\Delta \rho^i_{rate}$: a range rate calculated from the Doppler frequency of the satellite i [m/s], and
dT$_{rcv\text{-}drift}$: a drift error in the receiver clock [m/s].

In Step ST210, the GNSS positioning part (LS method) 103 calculates the azimuth (GNSS-LS solution azimuth) of the subject vehicle from the vector of the GNSS-LS solution velocity calculated in Step ST209.

In Step ST211, the GNSS positioning part (LS method) 103 evaluates the error in and the reliability of the GNSS-LS solution position by the same method as the evaluation method for the error in and the reliability of the GNSS position described with reference to FIGS. 9 to 11.

Next, description will be given in detail of Step ST114 shown in FIG. 2 with reference to FIG. 4. In Step ST114 shown in FIG. 2, the processings of Steps ST301 to ST309 shown in FIG. 4 are executed.

In Step ST301, the GNSS positioning part (KF method) 108 sets the status of the GNSS positioning solution set in the positioning part 100 to "no KF solution is present".

In Step ST302, the GNSS satellite behavior estimation part 102 calculates the behavior (position and velocity) of the positioning-use satellite in GNSS-Time in the same manner as in Step ST202 shown in FIG. 3. Note that GNSS-Time is calculated with accuracy gradually increasing during convergence calculation.

In Steps ST303 and ST304, the GNSS positioning part (KF method) 108 corrects the pseudorange of each satellite output from the multi-GNSS receiver 10, and the positioning-use satellite selection/Raw error evaluation part 106 selects the positioning-use satellite, by the same methods as in Steps ST203 and ST204 shown in FIG. 3, respectively.

In Step ST305, the GNSS positioning part (KF method) 108 calculates the position of the subject vehicle using a calculation expression of the Kalman filter shown in Expression (9). Hereinafter, the position of the subject vehicle calculated by the GNSS positioning part (KF method) 108 is referred to as a "GNSS-KF solution position".

$$\left. \begin{aligned} x_{j+1|j} &= F x_{j|j} \\ P_{j+1|j} &= F P_{j|j} F T + Q_{wj} \\ x_{j|j} &= x_{j|j-1} + K_j (y_j - H_j x_{j|j-1}) \\ K_j &= P_{j|j-1} H_j T (H_j P_{j|j-1} H_j^T + Q_{vj})^{-1} \\ P_{j|j} &= P_{j|j-1} - K_j H_j P_{j|j-1} \end{aligned} \right\} \qquad (9)$$

where $$x_j = [p_G x_j, p_G y_j, p_G z_j, p_G I_j]^T$$

$$y_j = \begin{pmatrix} \rho^1_{ct'} - R^1 \\ \rho^2_{ct'} - R^2 \\ \vdots \\ \rho^n_{ct'} - R^n \end{pmatrix}$$

$$F = \begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

$$H_j = \begin{pmatrix} LOS^1_{x\_j} & LOS^1_{y\_j} & LOS^1_{z\_j} & 1 \\ LOS^2_{x\_j} & LOS^2_{y\_j} & LOS^2_{z\_j} & 1 \\ \vdots & \vdots & \vdots & \vdots \\ LOS^n_{x\_j} & LOS^n_{y\_j} & LOS^n_{z\_j} & 1 \end{pmatrix}$$

$$Q_{wj} = \begin{pmatrix} \sigma^2_{pGx} & 0 & 0 & 0 \\ 0 & \sigma^2_{pGy} & 0 & 0 \\ 0 & 0 & \sigma^2_{pGz} & 0 \\ 0 & 0 & 0 & 1 \end{pmatrix}$$

$$Q_{vj} = \begin{pmatrix} \sigma^2_{1\rho j} & 0 & 0 & 0 & 0 & 0 \\ 0 & \sigma^2_{2\rho j} & 0 & 0 & 0 & 0 \\ 0 & 0 & \sigma^2_{3\rho j} & 0 & 0 & 0 \\ 0 & 0 & 0 & \sigma^2_{4\rho j} & 0 & 0 \\ \vdots & \vdots & \vdots & \vdots & \vdots & \vdots \\ 0 & 0 & 0 & 0 & 0 & \sigma^2_{n\rho j} \end{pmatrix}$$

x: a state variable that takes the position of the subject vehicle calculated using the Kalman filter and the receiver clock error (bias error) as parameters, y: an observed value of the Kalman filter (for a positioning-use satellite, a difference between the pseudorange and the two-point range is set), F: a drive matrix of the Kalman filter, H: an observation matrix of the Kalman filter (for a positioning-use satellite, the line of site vector when viewing the satellite from the subject vehicle is set), K: a gain of the Kalman filter, P: an error covariance matrix of the Kalman filter, Qw: a process error covariance matrix of the Kalman filter (as shown in FIGS. 9 to 11, an error in the KF solution is determined, and a variance of the error is set), $Q_v$: an observation error covariance matrix of the Kalman filter (for a positioning-use satellite, a variance of the error in an error in the pseudorange is set), $\sigma_{pGx}$: a standard deviation of x coordinate of a position error in GNSS positioning (GNSS position error), $\sigma_{pGy}$: a standard deviation of y coordinate of the position error in GNSS positioning (GNSS position error), $\sigma_{pGz}$: a standard deviation of z coordinate of the position error in GNSS positioning (GNSS position error), index j|j: an estimated value in the current epoch (j), and index j|j−1: a predicted value in the current epoch (j) based on a previous epoch (j-1).

In Step ST306, the GNSS positioning part (KF method) 108 confirms the number of convergence calculations in the current epoch. When the number of convergence calculations is equal to or less than a specified value (YES in Step ST306), the processing proceeds to Step ST307. When the number of convergence calculations is greater than the specified value (NO in Step ST306), a determination is made that convergence has failed, and the processing shown in FIG. 4 is terminated.

In Step ST307, the GNSS positioning part (KF method) 108 confirms the change amount of the GNSS-KF solution position in the current epoch. When the change amount of the GNSS-KF solution position is equal to or less than a specified value (YES in Step ST307), a determination is made that convergence has been achieved, and the processing proceeds to Step ST308. When the change amount of the GNSS-KF solution position is greater than the specified value (NO in Step ST307), a determination is made that convergence has failed, the time is updated, and the processing returns to Step ST302.

In Step ST308, the GNSS positioning part (KF method) 108 sets the status of the GNSS positioning solution to "KF solution is present".

In Step ST309, the GNSS positioning part (KF method) 108 evaluates the error in and the reliability of the GNSS-KF solution position by the same method as the evaluation method for the error in and the reliability of the GNSS position described with reference to FIGS. 9 to 11. Note that, in Step ST309, in a case where the positioning result of the multi-GNSS receiver 10 is reliable, when the GNSS-KF solution position falls within a range of a positioning error of the GNSS position as shown in FIG. 18, the GNSS-KF solution position is determined to be valid, and when the GNSS-KF solution position falls out of the range of the positioning error of the GNSS position as shown in FIG. 19, the GNSS-KF solution position is determined to be invalid. Further, in a case where the positioning result of the multi-GNSS receiver 10 is unreliable, when the positioning-use satellites include a predetermined number or more of PPP satellites (satellites for which the pseudorange smoothed value is selected as the pseudorange), the GNSS-KF solution position is determined to be valid.

Next, description will be given in detail of Step ST116 shown in FIG. 2 with reference to FIG. 5. In Step ST116 shown in FIG. 2, the processings of Steps ST401 to ST406 shown in FIG. 5 are executed.

In Step ST401, the complex positioning part (KF method) 109 sets the status of the complex positioning solution set in the positioning part 100 to "no KF solution is present".

In Step ST402, the complex positioning part (KF method) 109 calculates each correction amount of the position (DR position) and the velocity (DR velocity) of the subject vehicle updated in Step ST105 shown in FIG. 2 by the Kalman filter method (the DR position and the DR velocity are updated by adding the movement vector (velocity vector) of the subject vehicle in the current epoch calculated from output signals of the velocity sensor 110 and the angular velocity sensor 113 to the position of the subject vehicle calculated in the previous epoch). Specifically, the complex positioning part (KF method) 109 conducts the calculation with reference to the GNSS-KF solution position calculated by the GNSS positioning part (KF method) 108 using a calculation expression of the Kalman filter shown in Expression (10).

$$\left.\begin{array}{l} x_{j+1|j} = F x_{j|j} + D e_j \\ P_{j+1|j} = F P_{j|j} F T + Q_{wj} \\ x_{j|j} = x_{j|j-1} + K_j(y_j - H_j x_{j|j-1}) \\ K_j = P_{j|j-1} H T (H_j P_{j|j-1} H T + Q_{vj})^{-1} \\ P_{j|j} = P_{j|j-1} - K_j H P_{j|j-1} \end{array}\right\} \quad (10)$$

where $$x_j = [p_D x_j, p_D y_j, p_D z_j, vDx_j, vDy_j, vDz_j]^T$$

$$y_j = [p_G x_j, p_G y_j, p_G z_j, vGx_j, vGy_j, vGz_j]^T$$

$$e_j = [\varepsilon p_D x_j, \varepsilon p_D y_j, \varepsilon p_D z_j, \varepsilon vDx_j, \varepsilon vDy_j, \varepsilon vDz_j]^T$$

$$F = \begin{pmatrix} 1 & 0 & 0 & \Delta t & 0 & 0 \\ 0 & 1 & 0 & 0 & \Delta t & 0 \\ 0 & 0 & 1 & 0 & 0 & \Delta t \\ 0 & 0 & 0 & 1 & 0 & 0 \\ 0 & 0 & 0 & 0 & 0 & 1 \\ 0 & 0 & 0 & 0 & 0 & 0 \end{pmatrix}$$

$$D = \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}$$

$$H = \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{pmatrix}$$

-continued $$Q_{wj} = \begin{pmatrix} \sigma_{pDx}^2 & 0 & 0 & 0 & 0 & 0 \\ 0 & \sigma_{pDy}^2 & 0 & 0 & 0 & 0 \\ 0 & 0 & \sigma_{pDz}^2 & 0 & 0 & 0 \\ 0 & 0 & 0 & \sigma_{vDx}^2 & 0 & 0 \\ 0 & 0 & 0 & 0 & \sigma_{vDy}^2 & 0 \\ 0 & 0 & 0 & 0 & 0 & \sigma_{vDz}^2 \end{pmatrix}$$

$$Q_{vj} = \begin{pmatrix} \sigma_{pGx}^2 & 0 & 0 & 0 & 0 & 0 \\ 0 & \sigma_{pGy}^2 & 0 & 0 & 0 & 0 \\ 0 & 0 & \sigma_{pGz}^2 & 0 & 0 & 0 \\ 0 & 0 & 0 & \sigma_{vGx}^2 & 0 & 0 \\ 0 & 0 & 0 & 0 & \sigma_{vGy}^2 & 0 \\ 0 & 0 & 0 & 0 & 0 & \sigma_{vGz}^2 \end{pmatrix}$$

x: a state variable that takes the error in the position of the subject vehicle and the error in the velocity of the subject vehicle calculated using the Kalman filter as parameters, y: an observed value of the Kalman filter (a variable that takes a position error and a velocity error of KF solution for complex positioning as parameters), (the position error corresponds to a difference between the KF solution for GNSS positioning and KF solution for the complex positioning, and the velocity error corresponds to a difference between the LS solution and the velocity determined by dead reckoning), F: a drive matrix of the Kalman filter, H: an observation matrix of the Kalman filter, K: a gain of the Kalman filter, P: an error covariance matrix of the Kalman filter, Qw a process error covariance matrix of the Kalman filter (the position error is determined as shown in FIGS. 9 to 11, and a variance of the position error is set; for the velocity error, a variance of a difference between velocity vectors of an autonomous sensor and Doppler), Qv: an observation error covariance matrix of the Kalman filter (for a positioning-use satellite, a variance of the error in pseudorange is set), e: a control input of the Kalman filter, $\sigma_{pDx}$: a standard deviation of x coordinate of the position error in dead reckoning (DR position error), $\sigma_{pDy}$: a standard deviation of y coordinate of the position error in dead reckoning (DR position error), $\sigma_{pDz}$ represents a standard deviation of z coordinate of position error in dead reckoning (DR position error), $\sigma_{vDx}$: a standard deviation of x coordinate of the velocity error in dead reckoning, $\sigma_{vDy}$: a standard deviation of y coordinate of the velocity error in dead reckoning, $\sigma_{vDz}$: a standard deviation of z coordinate of the velocity error in dead reckoning, $\sigma_{pGx}$: a standard deviation of x coordinate of the position error in GNSS positioning (GNSS position error), $\sigma_{pGy}$: a standard deviation of y coordinate of the position error in GNSS positioning (GNSS position error), $\sigma_{pGz}$: a standard deviation of z coordinate of the position error in GNSS positioning (GNSS position error), $\sigma_{vGx}$: a standard deviation of x coordinate of the velocity error in GNSS positioning, $\sigma_{vGy}$: a standard deviation of y coordinate of the velocity error in GNSS positioning, and $\sigma_{vGz}$: a standard deviation of z coordinate of the velocity error in GNSS positioning.

Figure 20:
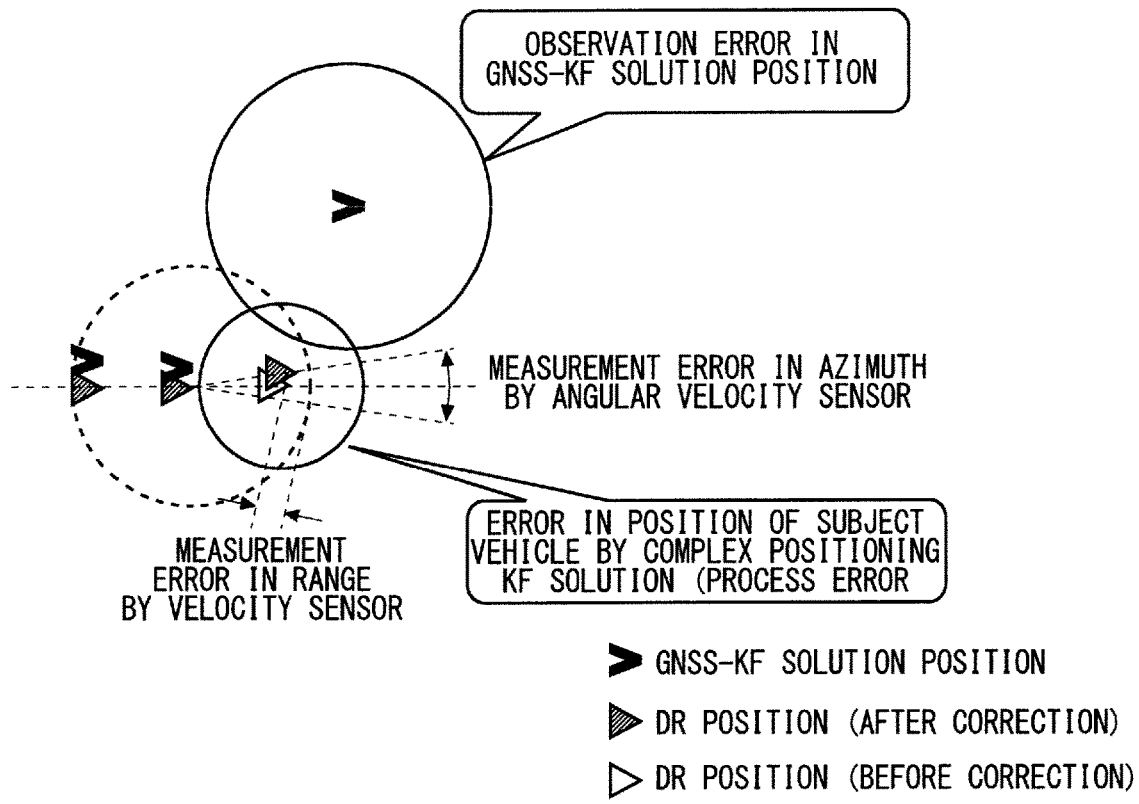
FIG. 20 is a diagram illustrating correction of an error in a DR position.
Figure 21:
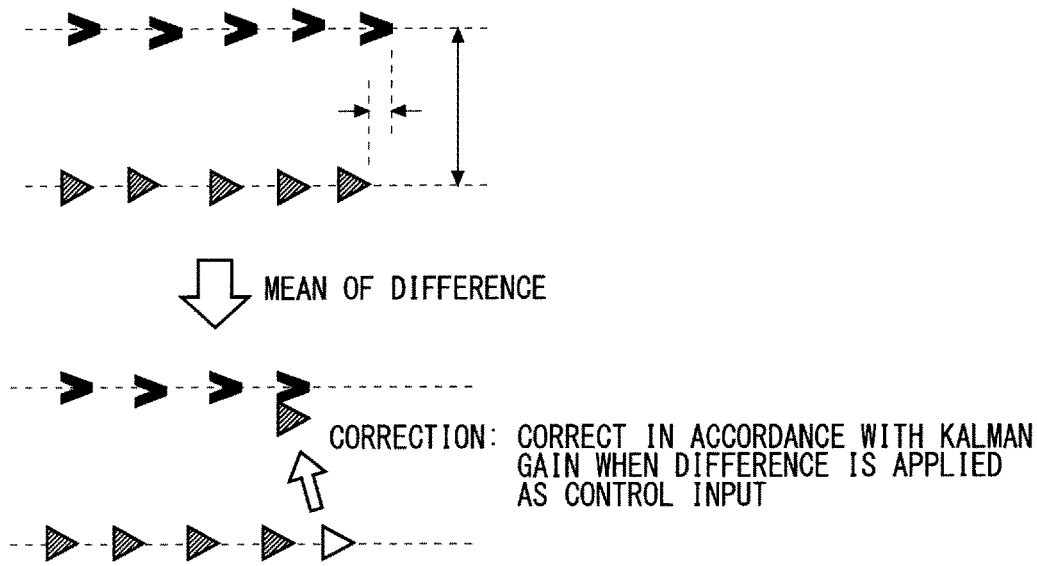
FIG. 21 is a diagram illustrating the correction of an error in a DR position.

As shown in FIG. 20, the correction amount of the DR position that is a KF solution is determined based on a Kalman filter gain in accordance with a difference between the error in the movement amount of the position of the subject vehicle (the error in the velocity vector) caused by errors in the velocity sensor 110 and the angular velocity sensor 113, respective process errors in the DR position and the DR velocity, and an observation error in the GNSS-KF solution position. However, when the GNSS position to be referenced is reliable and a fixed difference (deviation) equal to or greater than the specified value is present between the GNSS-KF solution position and the DR position as shown in FIG. 21, the complex positioning part (KF Method) 109 determines that the difference is a residual error in the position of the subject vehicle calculated by the dead reckoning, and calculates the correction amount of the DR position by applying a mean value of the difference as a control input to a state variable of the Kalman filter to correct the DR position.

In Step ST403, the complex positioning part (KF method) 109 confirms the number of convergence calculations in the current epoch. When the number of convergence calculations is equal to or less than a specified value (YES in Step ST403), the processing proceeds to Step ST404. When the number of convergence calculations is greater than the specified value (NO in Step ST403), a determination is made that convergence has failed, and the processing shown in FIG. 5 is terminated.

In Step ST404, the complex positioning part (KF method) 109 confirms the change amount of the KF solution in the current epoch. When the change amount of the KF solution is equal to or less than a specified value (YES in Step ST404), a determination is made that convergence has been achieved, and the processing proceeds to Step ST405. When the change amount of the KF solution is greater than the specified value (NO in Step ST404), a determination is made that convergence has failed, the time is updated, and the processing returns to Step ST402.

In Step ST405, the complex positioning part (KF method) 109 sets the status of the complex positioning solution to "KF solution is present".

In Step ST406, the complex positioning part (KF method) 109 evaluates the error in and the reliability of the KF solution by the same method as the evaluation method for the error in and the reliability of the GNSS position described with reference to FIGS. 9 to 11. However, when the movement amount and the movement direction of the DR position are equal to or greater than a specified value, the KF solution is determined to be invalid.

Further, when the GNSS-KF solution position calculated by the GNSS positioning part (KF method) 108 is determined to be invalid in Step ST309 shown in FIG. 4, the complex positioning part (KF method) 109 compares the GNSS position (reliable one) calculated by the multi-GNSS receiver 10 with the DR position, and, when a range therebetween is equal to or greater than a predetermined threshold value, the complex positioning part (KF method) 109 initializes the Kalman filter using the positioning result of the multi-GNSS receiver 10.

In the locator device according to the first embodiment, since the positioning processing is executed in a distributed manner, even when not all the positioning results (position and azimuth) are obtained, it is possible to obtain a partial positioning result (position or azimuth) or confirm each error in the middle of the positioning processing. It is possible to calculate the same information by a plurality of means essential for increasing robustness in positioning and to further reduce the cost with a low-cost SoC.

Further, even when the multi-GNSS receiver 10 does not support precise point positioning (PPP) even under open sky, it is possible to conduct the PPP. Further, since the pseudorange that obviously contains the multipath error is removed from the positioning-use satellites, it is possible to conduct the PPP even in the multipath environment or an environment where visibility over the subject vehicle is restricted.

In general, in a case of PPP using only Raw data of a GPS satellite, when the visibility over the subject vehicle is restricted or under the influence of multipath, the number of satellites available for the PPP decreases, and a risk of lowering the positioning precision increases. The locator device according to the present embodiment is capable of confirming the precision of the PPP with reference to the positioning result of the multi-GNSS receiver 10 that has conducted the positioning using a satellite other than a GPS satellite with a high elevation angle that is not affected by multipath. This makes it possible to prevent the positioning result of the PPP with lower precision from being used for complex positioning, and to stabilize the positioning precision even in urban areas where many high-rise buildings are located.

For example, even when positional deviation arises in the positioning result of the PPP using only a GPS satellite due to a decrease in the number of positioning-use satellites, the use of the positioning result of the reliable multi-GNSS receiver 10 makes it possible to prevent the positional deviation from becoming larger than a certain level, which makes the positioning precision stable even in urban areas.

Since the azimuth error can be corrected separately from the position error in the dead reckoning, even when the position error cannot be calculated stably due to the influence of multipath, the azimuth error can be continuously and stably corrected. Correction of the azimuth determined by the dead reckoning allows the zero point output of the angular velocity sensor to be corrected while the subject vehicle is traveling, and makes it possible to suppress an integration error in the dead reckoning. Further, there is an advantage that eliminates a decrease in position precision of the dead reckoning due to a forcible use of the GNSS positioning result affected by multipath.

Since the correction of the dead reckoning is conducted after confirmation of whether the positioning result of the GNSS receiver corresponds to a positioning result with such high precision as to match the positioning result of the dead reckoning, it is possible to conduct a smooth update (correction) of the position of the subject vehicle necessary for achieving lane-level precision. Further, when it is difficult to achieve the lane-level precision due to a decrease in correction frequency of the position error in the dead reckoning, the use of a reliable multi-GNSS positioning result allows the dead reckoning to be quickly initialized.

Further, although the precision of the GNSS position tends to decrease in the multipath environment or the like, in the present embodiment, the error in the GNSS position is separately evaluated, and when the error is small and the reliability of the GNSS position is high, the GNSS position is used for the position correction for the dead reckoning. Therefore, a risk of erroneously correcting the azimuth error in the dead reckoning, the receiver clock error, and the error in the autonomous sensor is greatly reduced.

[Modification]

In the first embodiment, the example has been given in which the multi-GNSS receiver 10 that supports the plurality of positioning satellite systems is used as the GNSS receiver, but, instead of this example, a GPS receiver capable of obtaining the positioning augmentation signal may be used. In the above description, when the GNSS position that is the positioning result of the multi-GNSS receiver 10 is reliable, the GNSS position is used for various calculations, but only the positioning result of the GNSS positioning part (KF method) 108 may be used without use of the positioning result of the multi-GNSS receiver 10 at all. Even with such a configuration, a decrease in positioning precision in the multipath environment can be suppressed.

In the first embodiment, in the GNSS positioning calculation using the Kalman filter, the example has been given in which the pseudorange observed value and the pseudorange smoothed value coexist as the pseudorange of the positioning-use satellite, but even with the use of the pseudorange smoothed value only, it is possible to achieve highly precise positioning with lane-level precision.

Further, in the first embodiment, the GNSS azimuth is calculated from the Doppler frequency, but the reliability of the Doppler frequency may be further evaluated using the carrier wave phase. This makes it possible to increase precision in the azimuth determined by the dead reckoning and reduce a risk of lowering precision in the position of the subject vehicle due to a forcible use of the GNSS positioning result with lower reliability.

The number of parameters for the state variable in the calculation using the Kalman filter conducted by the GNSS positioning part (KF method) 108 and the complex positioning part (KF method) 109 may be increased within a margin of the processing load of the SoC constituting the positioning part 100. This makes it possible to further suppress a decrease in precision in the multipath environment or the like.

Further, in the first embodiment, uniaxial angular velocity sensors are used as the velocity sensor 110 and the angular velocity sensor 113 that are autonomous sensors, but instead of such sensors, a triaxial gyroscope and a triaxial acceleration sensor may be used to enable three dimensional dead reckoning. In this case, even when the subject vehicle travels on a road having undulations, a height difference or road surface inclination, highly precise positioning becomes possible.

The positioning augmentation signal is obtained not only from the SBAS satellite, but also by communication or from another satellite as long as precision equal to or higher than the precision achieved by the SBAS satellite is achieved.

In a configuration that enables the locator device to conduct lane-level map matching (lane matching) using a high-precision map containing lane-level lane information and to reliably identify a traveling lane, an error in the KF solution for complex positioning determined with reference to coordinates of the position of the subject vehicle on the traveling lane after the map matching may be used as a control input for the KF solution. This makes it possible to further suppress a decrease in positioning precision in the multipath environment. Description has been given of the lane matching in Japanese Patent No. 3559142 and Japanese Patent No. 3568768 filed by the inventors of the present invention.

Second Embodiment

The second embodiment includes an extension to the function of the complex positioning in the first embodiment. The second embodiment is the same as the first embodiment in basic configuration and operation of the locator device, and therefore description of only differences from the first embodiment will be given herein.

Figure 22:
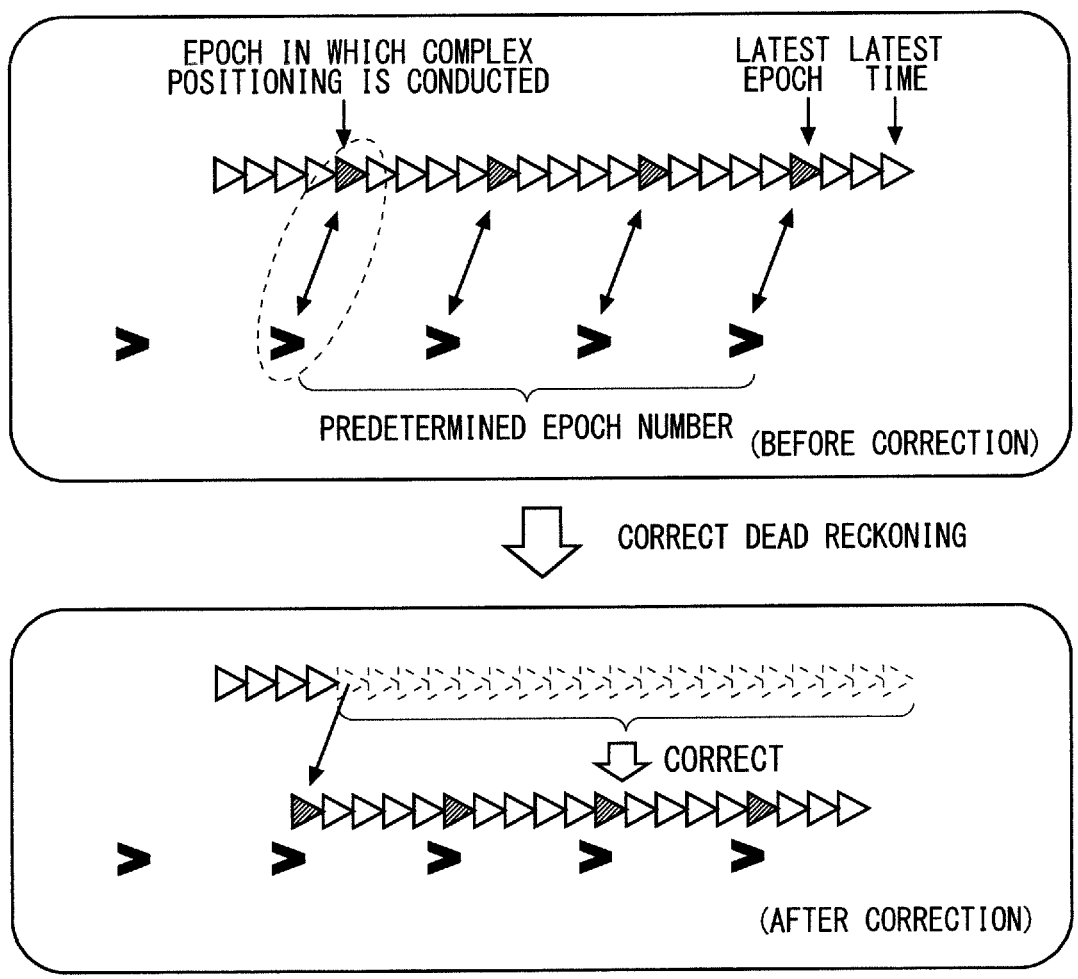
FIG. 22 is a diagram illustrating complex positioning in a locator device according to a second embodiment.

In the second embodiment, as shown in FIG. 22, the complex positioning part (KF method) 109 creates history information (including the position (DR position) of the subject vehicle determined by the dead reckoning, the GNSS positioning result to be referenced, and the Raw data) in predetermined epochs, and conducts complex positioning on the history information. That is, the complex positioning part (KF method) 109 calculates the error in the dead reckoning in the past epoch by the complex positioning, and corrects, based on the error, the history information in the past epoch together with history information newer than the history information in the past epoch, and the latest history information.

Figure 23:
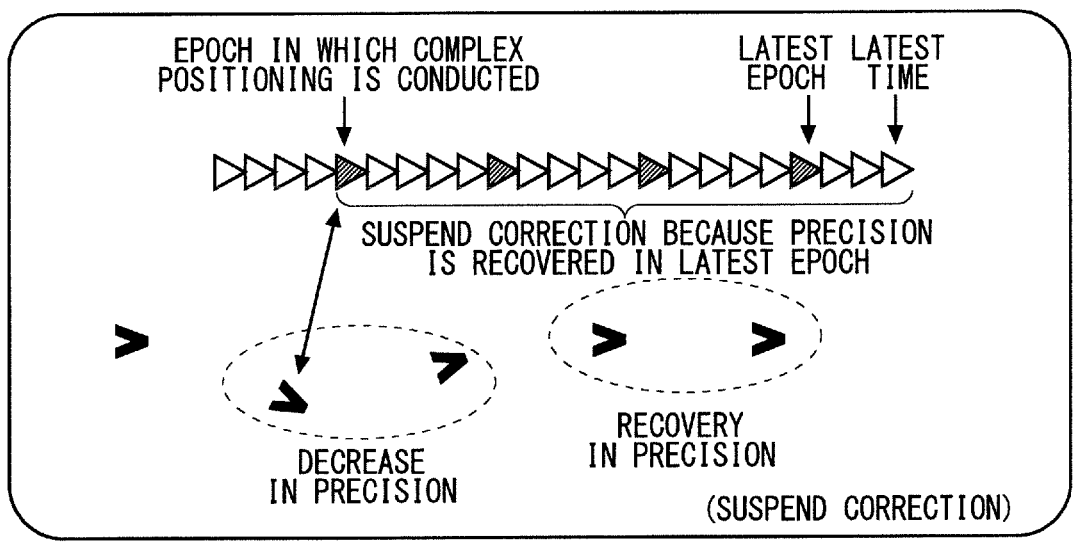
FIG. 23 is a diagram illustrating the complex positioning in the locator device according to the second embodiment.

However, when the error in the GNSS position to be referenced is greater than a predetermined threshold value in the past epoch (past epoch in which the error in the dead reckoning is calculated) in which the complex positioning is conducted, or the change amount of the error in the position (DR position) of the subject vehicle determined by the dead reckoning is greater than the predetermined threshold value, it is treated as follows. That is, the complex positioning part (KF method) 109 confirms the Raw data (pseudorange) in the latest epoch, and when the Raw data in the latest epoch does not have an error equal to or greater than the predetermined threshold value, the error in the past epoch is determined to be a multipath error, and therefore, the history information is not corrected. For example, as shown in FIG. 23, when the precision in the GNSS position decreases due to the multipath error in the past epoch in which the complex positioning is conducted, the complex positioning part (KF method) 109 confirms the history information in the latest epoch, and suspends, when the precision in the GNSS positioning result is recovered in the history information thus confirmed, the correction of the history information based on the error in the dead reckoning in the past epoch.

Alternatively, in the above case, whether the same error arises in an epoch following the past epoch is confirmed, and when the same error as in the past epoch arises, the error in the past epoch may be determined to be the error in the dead reckoning rather than the multipath error, and the history information may be corrected (when the same error as in the past epoch does not arise in the epoch following the past epoch, the history information is not corrected).

In the locator device according to the second embodiment, since the history information in an epoch newer than the past epoch is corrected with the error in the dead reckoning in the past epoch obtained by the complex positioning, the locator device can conduct stable positioning that is less liable to be affected by a temporary decrease in the GNSS positioning precision.

Third Embodiment

Figure 24:
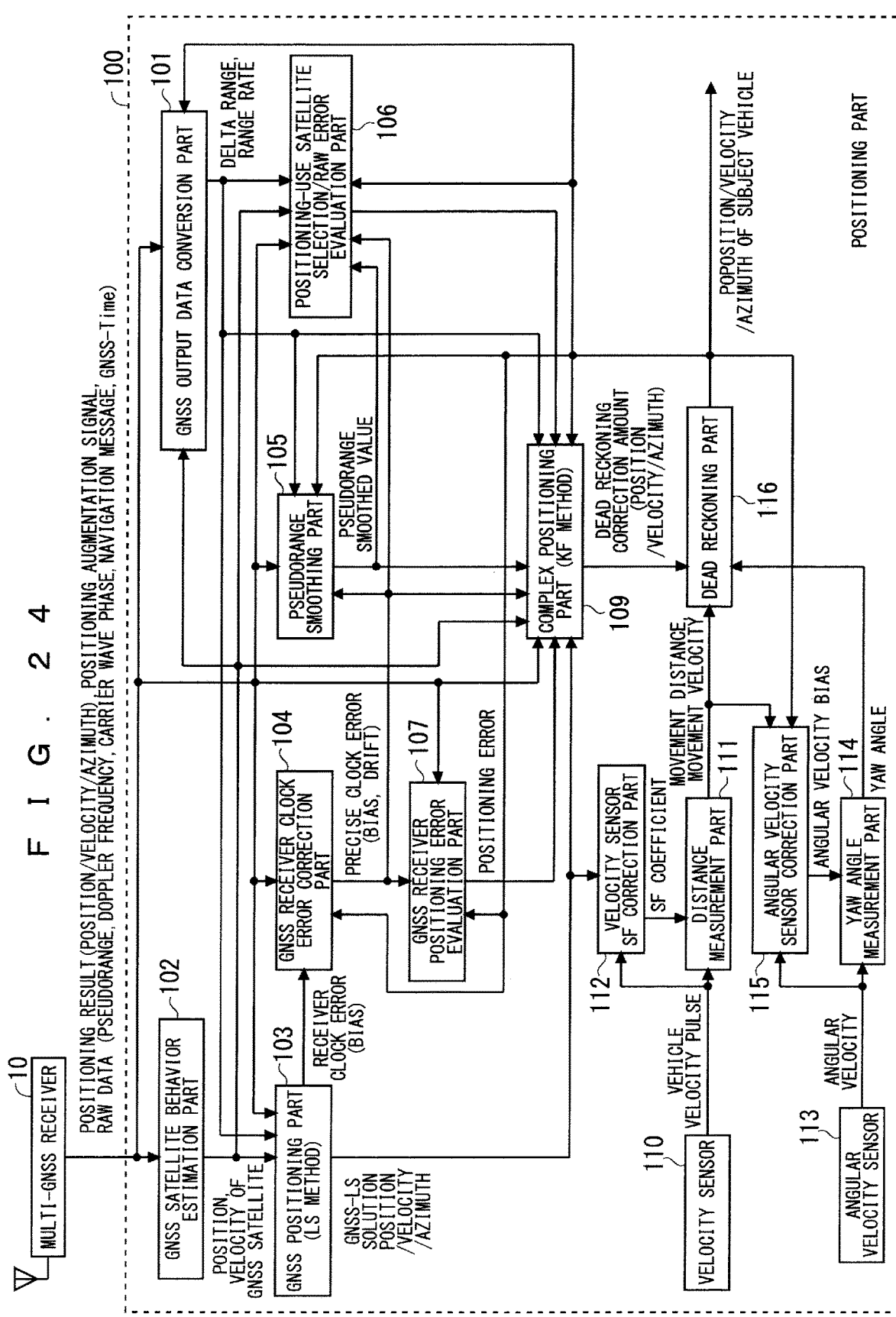
FIG. 24 is a block diagram showing a configuration of a locator device according to a third embodiment.

FIG. 24 is a block diagram showing a configuration of a locator device according to a third embodiment. The configuration of the locator device shown in FIG. 24 is the same as the configuration shown in FIG. 1 except that the GNSS positioning part (KF method) 108 of the positioning part 100 is removed and integrated into the complex positioning part (KF method) 109.

The complex positioning part (KF method) 109 according to the third embodiment corrects various errors in the pseudorange or the pseudorange smoothed value used for positioning calculation, and the range rate using the positioning augmentation signal (satellite orbital error, satellite clock error, ionospheric propagation delay error, tropospheric propagation delay error) of the SBAS satellite and the precise clock error (bias error and drift error) of the multi-GNSS receiver 10 calculated by the GNSS receiver clock error correction part 104. Furthermore, the complex positioning part (KF method) 109 uses the position and the velocity of the GNSS satellite calculated by the GNSS satellite behavior estimation part 102 to conduct, by PPP positioning, convergence calculation of the error in the position (DR position) of the subject vehicle and the error in the velocity (DR velocity) of the subject vehicle calculated by the dead reckoning part 116.

Figure 25:
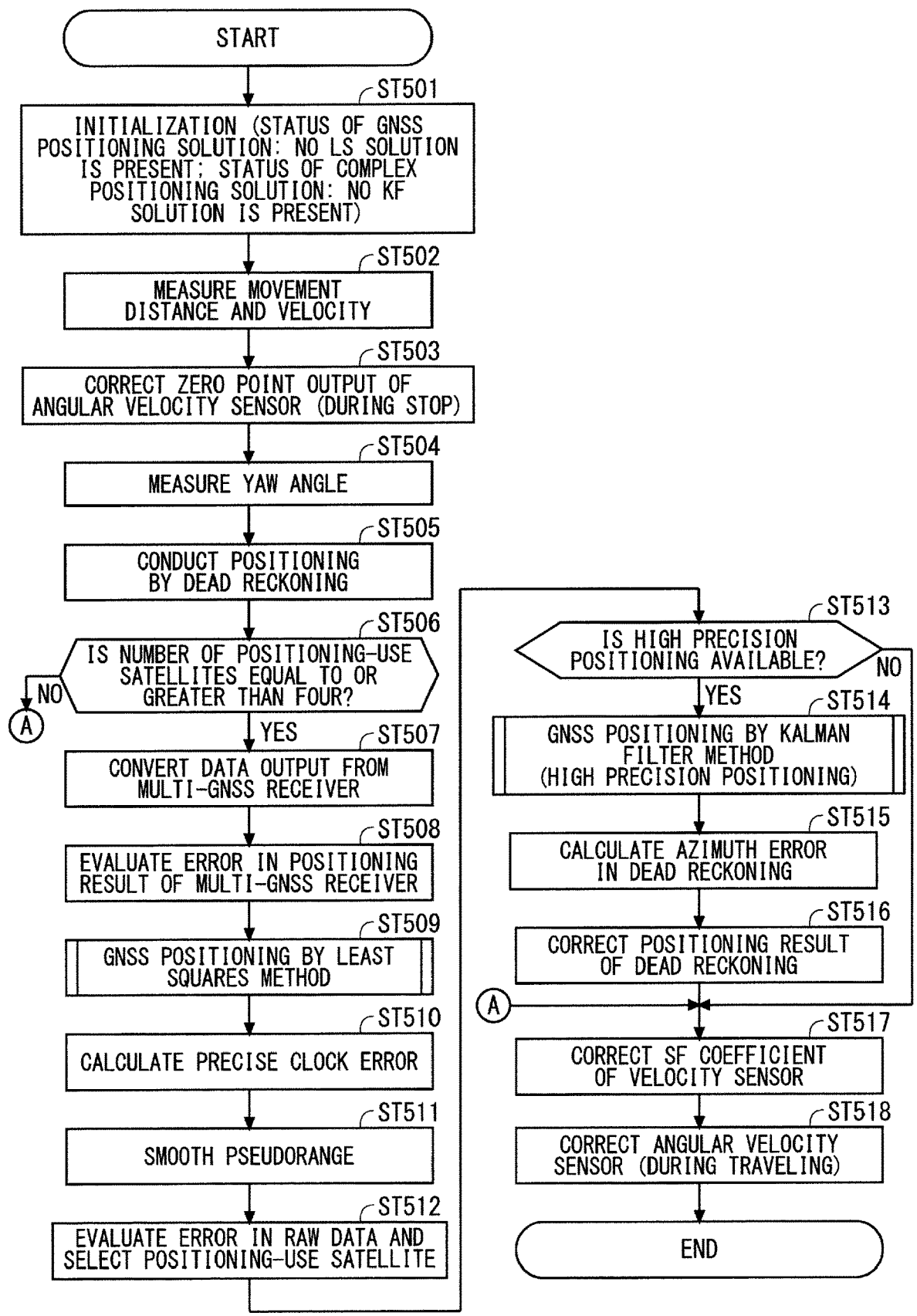
FIG. 25 is a flowchart showing main processing of a positioning part of the locator device according to the third embodiment.
Figure 26:
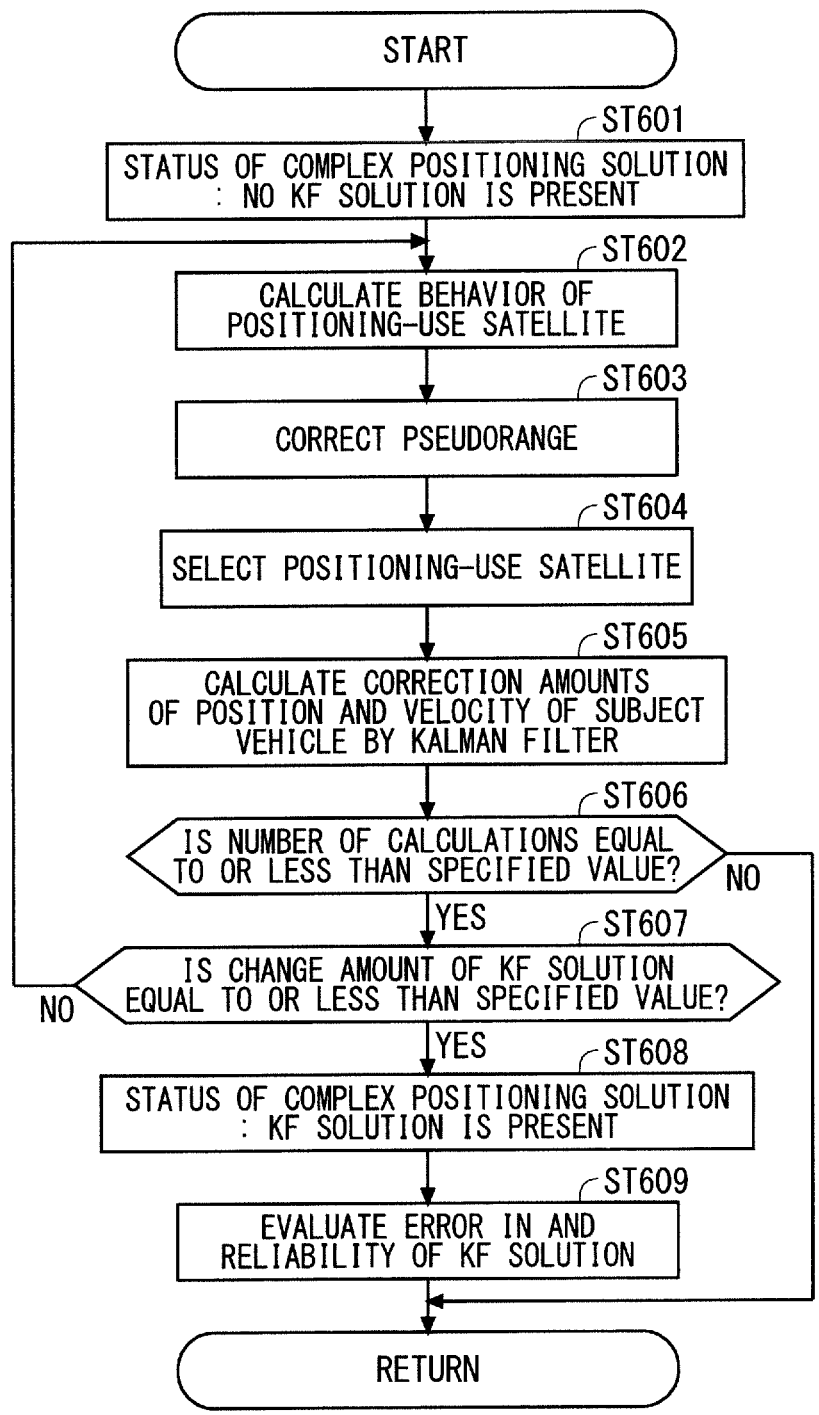
FIG. 26 is a flowchart showing a process of Step ST514 shown in FIG. 25.

An operation of the locator device according to the third embodiment will be described. FIG. 25 is a flowchart showing main processing of the positioning part 100. FIG. 26 is a flowchart showing processing of the complex positioning part (KF method) 109. The flow shown in FIG. 25 is executed at predetermined intervals, and the flow shown in FIG. 26 is executed in Step ST514 show in FIG. 25.

In the main processing shown in FIG. 25, the processings of Steps ST501 to ST513 are the same as Steps ST101 to ST113 shown in FIG. 2, respectively. Note that, in the present embodiment, since the GNSS positioning part (KF method) 108 is omitted, the status of the GNSS positioning solution indicating the presence or absence of the KF solution is not set.

In Step ST513, when a determination is made that high precision positioning (PPP positioning) is possible (YES in Step ST513), the following Steps ST514 to ST516 are executed, and when a determination is made that PPP positioning is not possible (NO in Step ST513), the processing proceeds to Step ST517.

Step ST514 is a combination of Steps ST114 and ST116 shown in FIG. 2. In Step ST514, the complex positioning part (KF method) 109 conducts PPP positioning by the Kalman filter method of correction amounts of the position (DR position) of the subject vehicle and the velocity (DR velocity) of the subject vehicle calculated by the dead reckoning part 116, using various errors calculated from the pseudorange (observed value or smoothed value) of the positioning-use satellite, the range rate, the orbit (position and velocity) of the GNSS satellite, and the positioning augmentation signal, and the receiver clock error. Description will be given below in detail of this process with reference to FIG. 26.

In Step ST515 that is the same as Step ST115 shown in FIG. 2, the complex positioning part (KF method) 109 calculates the error in the azimuth (DR azimuth) of the subject vehicle in the dead reckoning using the GNSS-LS solution azimuth calculated in Step ST509. When a determination is made that the GNSS azimuth is reliable in Step ST508 and a difference between the GNSS-LS solution azimuth calculated in Step ST509 and the GNSS azimuth output from the multi-GNSS receiver 10 is equal to or less than the specified value, this process is executed.

In Step ST516 that is the same as the Step ST117 shown in FIG. 2, the dead reckoning part 116 uses the error in the dead reckoning (the respective errors in the DR position, the DR velocity, and the DR azimuth) calculated in Steps ST514 and ST515 to correct the positioning result of the dead reckoning.

In Steps ST517 and ST518, processes that are the same as Steps ST118 and ST119 shown in FIG. 2 are executed. When the processings of Step ST518 is completed, the flow shown in FIG. 25 comes to an end.

Next, description will be given in detail of Step ST514 shown in FIG. 25 with reference to FIG. 26. In Step ST514 shown in FIG. 25, the processings of Steps ST601 to ST609 shown in FIG. 26 are executed.

In Step ST601, the complex positioning part (KF method) 109 sets the status of the complex positioning solution set in the positioning part 100 to "no KF solution is present".

In Step ST602 that is the same as Step ST202 shown in FIG. 3, the GNSS satellite behavior estimation part 102 uses the navigation message output from the multi-GNSS receiver 10 and the positioning augmentation signal (satellite orbital error) to calculate a behavior (position and velocity) of the positioning-use satellite in GNSS-Time. Note that GNSS-Time is calculated with accuracy gradually increasing during convergence calculation.

In Steps ST603 and ST604, the complex positioning part (KF method) 109 corrects the pseudorange of each satellite output from the multi-GNSS receiver 10 by the same method as in Steps ST203 and ST204 shown in FIG. 3, and selects a positioning-use satellite.

In Step ST605, the complex positioning part (KF method) 109 calculates, by calculation using the Kalman filter, respective correction amounts of the position (DR position) of the subject vehicle and the velocity (DR velocity) of the subject vehicle determined by the dead reckoning. This calculation expression of the Kalman filter is a general expression. That is, the state variable of the Kalman filter corresponds to the position and the velocity determined by the dead reckoning part 116, and the receiver clock error (bias error and drift error), and includes a control input for correcting positional deviation. The observed value includes the pseudorange of the positioning-use satellite and the range rate.

As shown in FIG. 20, the correction amount of the DR position that is a KF solution is determined based on a Kalman filter gain in accordance with a difference between the error in the movement amount of the position of the subject vehicle (the error in the velocity vector) caused by errors in the velocity sensor 110 and the angular velocity sensor 113, respective process errors in the DR position and the DR velocity, and an observation error in the GNSS-KF solution position. However, when the GNSS position to be referenced is reliable and a fixed difference equal to or greater than the specified value is present between the GNSS-KF solution position and the DR position as shown in FIG. 21, the complex positioning part (KF Method) 109 applies a mean value of the difference as a control input to the state variable of the Kalman filter to correct the DR position.

In Step ST606, the complex positioning part (KF method) 109 confirms the number of convergence calculations in the current epoch. When the number of convergence calculations is equal to or less than a specified value (YES in Step ST606), the processing proceeds to Step ST607. When the number of convergence calculations is greater than the specified value (NO in Step ST606), a determination is made that convergence has failed, and the processing shown in FIG. 26 is terminated.

In Step ST607, the complex positioning part (KF method) 109 confirms the change amount of the KF solution in the current epoch. When the change amount of the KF solution is equal to or less than a specified value (YES in Step ST607), a determination is made that convergence has been achieved, and the processing proceeds to Step ST608. When the change amount of the KF solution is greater than the specified value (NO in Step ST607), a determination is made that convergence has failed, the time is updated, and the processing returns to Step ST602.

In Step ST608, the complex positioning part (KF method) 109 sets the status of the complex positioning solution to "KF solution is present".

In Step ST609, the complex positioning part (KF method) 109 evaluates the error in and the reliability of the KF solution by the same method as the evaluation method for the error in and the reliability of the GNSS position described with reference to FIGS. 9 to 11.

The third embodiment exhibits the same effect as the first embodiment does, except that the integration of the calculation expressions of the Kalman filter into one expression prevents a partial result (position of the subject vehicle or azimuth of the subject vehicle) from being obtained and leads to some increase in calculation load compared with the first embodiment.

<Example of Hardware Configuration>

Figure 27:
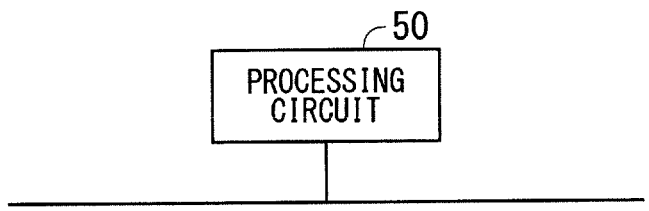
FIG. 27 is a diagram showing an example of a hardware configuration of the positioning part of the locator device.
Figure 28:
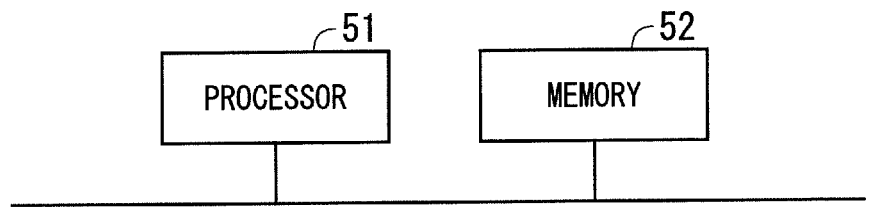
FIG. 28 is a diagram showing an example of the hardware configuration of the positioning part of the locator device.

FIGS. 27 and 28 are diagrams each showing an example of a hardware configuration of the positioning part 100. Each component of the positioning part 100 shown in FIG. 1 is implemented by the processing circuit 50 shown in FIG. 27, for example. That is, the processing circuit 50 is connected to the multi-GNSS receiver 10 configured to output the position of the subject vehicle, the Raw data, and the positioning augmentation signal, the position of the subject vehicle being calculated from the radio wave received from the GNSS satellite and the positioning augmentation signal received from the positioning augmentation satellite, the Raw data being extracted from the radio wave of the GNSS satellite, and includes the dead reckoning part 116 configured to calculate the position of the subject vehicle by dead reckoning, the pseudorange smoothing part 105 configured to smooth the pseudorange between the GNSS satellite and the position of the subject vehicle using the carrier wave phase included in the Raw data, the GNSS receiver positioning error evaluation part 107 configured to evaluate the reliability of the position of the subject vehicle calculated by the multi-GNSS receiver 10, the GNSS positioning part (KF method) 108 configured to calculate the position of the subject vehicle from the smoothed value of the pseudorange, the positioning augmentation signal, and the orbit of the GNSS satellite, and the complex positioning part (KF method) 109 configured to calculate the error in the dead reckoning conducted by the dead reckoning part 116 from the position of the subject vehicle calculated by the GNSS positioning part (KF method) 108 and to correct the position of the subject vehicle calculated by the dead reckoning part 116 based on the error in the dead reckoning. Dedicated hardware may be applied to the processing circuit 50, or alternatively, a processor, a central processing unit (CPU), a processing unit, an arithmetic unit, a microprocessor, a microcomputer, or a digital signal processor (DSP) that executes a program stored in a memory may be applied to the processing circuit 50.

In a configuration where the processing circuit 50 is dedicated hardware, the processing circuit 50 may be, for example, a single circuit, a composite circuit, a programmed processor, a processor for a parallel program, an application specific integrated circuit (ASIC), a field-programmable gate array (FPGA), a combination thereof, or the like. The functions of the component of the positioning part 100 may be implemented by a plurality of processing circuits, or the functions of the components may be collectively implemented by one processing circuit.

FIG. 28 shows a hardware configuration of the positioning part 100 in a case where the processing circuit 50 is constituted by the processor 51. In this case, the function of each of the components of the positioning part 100 is implemented by a combination of software and the like (software, firmware, or software and firmware). Software and the like are described as a program and are stored in the memory 52. The processor 51 serving as the processing circuit 50 reads out the program stored in the memory 52 and executes the program to implement the functions of the components. That is, the positioning part 100 includes the memory 52 for storing the program that is executed by the processing circuit 50 to eventually perform a process of receiving the position of the subject vehicle, the Raw data, and the positioning augmentation signal from the multi-GNSS receiver 10, the position of the subject vehicle being calculated from the radio wave received from the GNSS satellite and the positioning augmentation signal received from the positioning augmentation satellite, the Raw data being extracted from the radio wave of the GNSS satellite, a first positioning process of calculating the position of the subject vehicle by dead reckoning, a process of smoothing the pseudorange between the GNSS satellite and the position of the subject vehicle using the carrier wave phase included in the Raw data, a process of evaluating the reliability of the position of the subject vehicle calculated by the multi-GNSS receiver 10, a second positioning process of calculating the position of the subject vehicle from the smoothed value of the pseudorange, the positioning augmentation signal, and the orbit of the GNSS satellite, a process of calculating the error in the dead reckoning conducted in the first positioning process from the position of the subject vehicle calculated in the second positioning process, and a process of correcting the position of the subject vehicle calculated in the first positioning process based on the error in the dead reckoning. In other words, it can be said that this program causes the computer to perform a procedure or a method of the operation of each of the components of the positioning part 100.

Here, the memory 52 may be any one of a nonvolatile or volatile semiconductor memory, such as a random access memory (RAM), a read only memory (ROM), a flash memory, an erasable programmable read only memory (EPROM), or an electrically erasable programmable read only memory (EEPROM), a hard disk drive (HDD), a magnetic disk, a flexible disk, an optical disc, a compact disc, a MiniDisc, a digital versatile disc (DVD), a drive device thereof, or the like, or may be any storage medium to be available in the future.

In the above, the description has been given of the configuration in which the function of each of the components of the positioning part 100 is implemented by either hardware or software and the like. However, the present invention is not limited to such a configuration, and a configuration may be employed in which some components of the positioning part 100 are implemented by dedicated hardware, and the other components are implemented by software and the like. For example, functions of some components can be implemented by the processing circuit 50 serving as dedicated hardware, and functions of the other components can be implemented by the program stored in the memory 52 that is read out and executed by the processing circuit 50 serving as the processor 51.

As described above, the positioning part 100 can implement each of the above-described functions by hardware, software and the like, or a combination thereof.

As described above, the positioning device according to the present invention includes a global navigation satellite system (GNSS) receiver configured to output a position, a velocity, and an azimuth of a vehicle, Raw data, and a positioning augmentation signal, the position, the velocity, and the azimuth of the vehicle being calculated from a radio wave received from a GNSS satellite and the positioning augmentation signal received from a positioning augmentation satellite, the Raw data being extracted from the radio wave of the GNSS satellite, a dead reckoning part configured to calculate a position of the vehicle by dead reckoning, a pseudorange smoothing part configured to smooth a pseudorange between the GNSS satellite and the position of the vehicle using a carrier wave phase included in the Raw data, a GNSS receiver positioning error evaluation part configured to evaluate reliability of the position of the vehicle calculated by the GNSS receiver, a GNSS positioning part configured to calculate a position of the vehicle from a smoothed value of the pseudorange, the positioning augmentation signal, and an orbit of the GNSS satellite, and a complex positioning part configured to calculate an error in the dead reckoning conducted by the dead reckoning part from the position of the vehicle calculated by the GNSS positioning part and to correct the position of the vehicle calculated by the dead reckoning part based on the error in the dead reckoning.

Further, the complex positioning part calculates an error in the dead reckoning in a past epoch from a history of the position of the vehicle calculated by the dead reckoning part and a history of the position of the vehicle calculated by the GNSS receiver and corrects the history of the position of the vehicle calculated by the dead reckoning part and a latest position of the vehicle based on the error in the dead reckoning in the past epoch.

Further, the GNSS receiver positioning error evaluation part evaluates the reliability of the position of the vehicle calculated by the GNSS receiver based on any one of (a) a difference between a movement vector of the position of the vehicle calculated by the GNSS receiver and a velocity vector representing the velocity and the azimuth of the vehicle calculated by the GNSS receiver, (b) a difference between the position of the vehicle calculated by the GNSS receiver and the position of the vehicle calculated by the dead reckoning part, and (c) dilution of precision (DOP) based on geometry of GNSS satellites used by the GNSS receiver for positioning.

Further, the GNSS positioning part selects the GNSS satellite as a positioning-use satellite with which an unknown error becomes equal to or less than a predetermined threshold value, the unknown error corresponding to a residual that results from subtracting a known error calculated from the positioning augmentation signal and a two-point range between a position of the GNSS satellite and the position of the vehicle calculated by the dead reckoning part from the pseudorange or the smoothed value of the pseudorange.

Further, the GNSS positioning part conducts convergence calculation by Kalman filter method to calculate the position of the vehicle, and when the GNSS receiver positioning error evaluation part determines that a positioning result of the GNSS receiver is reliable, and the position of the vehicle obtained through the convergence calculation falls out of a range of a positioning error of the GNSS receiver, the GNSS positioning part determines that the position of the vehicle is invalid.

Further, the complex positioning part calculates an azimuth error in the dead reckoning based on an azimuth of the vehicle calculated from a Doppler frequency of the GNSS satellite, and conducts convergence calculation by Kalman filter method with the position of the vehicle calculated by the GNSS positioning part defined as an observed value to calculate a position error in the dead reckoning.

Further, when the position of the vehicle calculated by the GNSS positioning part is determined to be invalid, and a range between the position of the vehicle calculated by the GNSS receiver and the position of the vehicle calculated by the dead reckoning part is equal to or greater than a predetermined threshold value, the complex positioning part initializes a Kalman filter using the positioning result of the GNSS receiver.

Further, when a fixed difference is present between the position of the vehicle calculated by the GNSS positioning part and the position of the vehicle calculated by the dead reckoning part, the complex positioning part applies the difference as a control input to a state variable of a Kalman filter to calculate the error in the dead reckoning.

Further, when, in the past epoch for which the error in the dead reckoning is calculated, an error in the position of the vehicle calculated by the GNSS positioning part is greater than a predetermined threshold value, or a change amount of the error in the position of the vehicle calculated by the dead reckoning part is greater than the predetermined threshold value, the complex positioning part confirms a pseudorange in a latest epoch, and, when the pseudorange in the latest epoch does not have an error equal to or greater than the threshold value, the complex positioning part corrects neither the history of the position of the vehicle calculated by the dead reckoning part nor the latest position of the vehicle.

Further, when, in the past epoch for which the error in the dead reckoning is calculated, an error in the position of the vehicle calculated by the GNSS positioning part is greater than a predetermined threshold value, or a change amount of the error in the position of the vehicle calculated by the dead reckoning part is greater than the predetermined threshold value, the complex positioning part confirms whether the same error arises in an epoch following the past epoch, and, when the same error does not arise, the complex positioning part corrects neither the history of the position of the vehicle calculated by the dead reckoning part nor the latest position of the vehicle.

Furthermore, a positioning method of a positioning device according to the present invention includes causing a global navigation satellite system (GNSS) receiver of the positioning device to output a position, a velocity, and an azimuth of a vehicle, Raw data, and a positioning augmentation signal, the position, the velocity, and the azimuth of the vehicle being calculated from a radio wave received from a GNSS satellite and the positioning augmentation signal received from a positioning augmentation satellite, the Raw data being extracted from the radio wave of the GNSS satellite, causing a dead reckoning part of the positioning device to calculate a position of the vehicle by dead reckoning, causing a pseudorange smoothing part of the positioning device to smooth a pseudorange between the GNSS satellite and the position of the vehicle using a carrier wave phase included in the Raw data, causing a GNSS receiver positioning error evaluation part of the positioning device to evaluate reliability of the position of the vehicle calculated by the GNSS receiver, causing a GNSS positioning part of the positioning device to calculate a position of the vehicle from a smoothed value of the pseudorange, the positioning augmentation signal, and an orbit of the GNSS satellite, and causing a complex positioning part of the positioning device to calculate an error in the dead reckoning conducted by the dead reckoning part from the position of the vehicle calculated by the GNSS positioning part and to correct the position of the vehicle calculated by the dead reckoning part based on the error in the dead reckoning.

Note that the present invention can be implemented by any combination of the embodiments within the scope of the present invention, and each of the embodiments can be modified or omitted as appropriate.

Although the present invention has been described in detail, the above descriptions are illustrative in all aspects, and the present invention is not limited by the descriptions. It is understood that innumerable modifications not illustrated can be envisaged without departing from the scope of the present invention.

EXPLANATION OF REFERENCE SIGNS

10: multi-GNSS receiver
100: positioning part
101: GNSS output data conversion part
102: GNSS satellite behavior estimation part
103: GNSS positioning part (LS method)
104: GNSS receiver clock error correction part
105: pseudorange smoothing part
106: positioning-use satellite selection/Raw error evaluation part
107: GNSS receiver positioning error evaluation part
108: GNSS positioning part (KF method)
109: complex positioning part (KF method)
110: velocity sensor
111: distance measurement part
112: velocity sensor SF correction part
113: angular velocity sensor
114: yaw angle measurement part
115: angular velocity sensor correction part
116: dead reckoning part
50: processing circuit
51: processor
52: memory

The invention claimed is:

1. A positioning device comprising:
a processor to execute a program; and
a memory to store the program which, when executed by the processor, performs processes of,
acquiring a position, a velocity, and an azimuth of a vehicle, Raw data, and a positioning augmentation signal from a global navigation satellite system (GNSS) receiver, the position, the velocity, and the azimuth of the vehicle being calculated from radio waves received from at least four GNSS satellites and the positioning augmentation signal received from a positioning augmentation satellite, the Raw data being extracted from the radio waves of the at least four GNSS satellites;
calculating a position of the vehicle by dead reckoning;
smoothing a pseudorange between each of the at least four GNSS satellites and the vehicle using a carrier wave phase included in the Raw data, the pseudorange being included in the Raw data;
evaluating reliability of the position of the vehicle calculated by the GNSS receiver;
conducting GNSS positioning to calculate a position of the vehicle from a smoothed value of the pseudorange, the positioning augmentation signal, an orbit of the GNSS satellite, and an evaluation result of the reliability of the position of the vehicle calculated by the GNSS receiver;
conducting complex positioning to calculate an error in the dead reckoning from the position of the vehicle calculated by the GNSS positioning and to correct the position of the vehicle calculated by the dead reckoning based on the error in the dead reckoning; and
outputting a corrected position of the vehicle which is corrected by the complex positioning, wherein the processor, in the complex positioning, calculates an error in the dead reckoning in a past epoch from a history of the position of the vehicle calculated by the dead reckoning and a history of the position of the vehicle calculated by the GNSS receiver and corrects the history of the position of the vehicle calculated by the dead reckoning and a latest position of the vehicle calculated by the dead reckoning based on the error in the dead reckoning in the past epoch.

2. The positioning device according to claim 1, wherein the processor evaluates the reliability of the position of the vehicle calculated by the GNSS receiver based on any one of
 (a) a difference between a movement vector of the position of the vehicle calculated by the GNSS receiver and a velocity vector representing the velocity and the azimuth of the vehicle calculated by the GNSS receiver,
 (b) a difference between the position of the vehicle calculated by the GNSS receiver and the position of the vehicle calculated by the dead reckoning, and
 (c) dilution of precision (DOP) based on geometry of GNSS satellites used by the GNSS receiver for positioning.

3. The positioning device according to claim 1, wherein the processor, in the GNSS positioning, selects the GNSS satellite as a positioning-use satellite with which an unknown error becomes equal to or less than a predetermined threshold value, the unknown error corresponding to a residual that results from subtracting a known error calculated from the positioning augmentation signal and a two-point range between a position of the GNSS satellite and the position of the vehicle calculated by the dead reckoning from the pseudorange or the smoothed value of the pseudorange.

4. The positioning device according to claim 1, wherein the processor, in the GNSS positioning, conducts convergence calculation by Kalman filter method to calculate the position of the vehicle, and
 when the processor evaluates that a positioning result of the GNSS receiver is reliable, and the position of the vehicle obtained through the convergence calculation falls out of a range of a positioning error of the GNSS receiver, the processor determines that the position of the vehicle which is calculated by the GNSS positioning is invalid.

5. The positioning device according to claim 4, wherein when the position of the vehicle calculated by the GNSS positioning is determined to be invalid, and a range between the position of the vehicle calculated by the GNSS receiver and the position of the vehicle calculated by the dead reckoning is equal to or greater than a predetermined threshold value, the processor initializes a Kalman filter using the positioning result of the GNSS receiver in the complex positioning.

6. The positioning device according to claim 1, wherein the processor, in the complex positioning, calculates an azimuth error in the dead reckoning based on an azimuth of the vehicle calculated from a Doppler frequency of the GNSS satellite, and conducts convergence calculation by Kalman filter method with the position of the vehicle calculated by the GNSS positioning defined as an observed value to calculate a position error in the dead reckoning.

7. The positioning device according to claim 6, wherein when a fixed difference is present between the position of the vehicle calculated by the GNSS positioning and the position of the vehicle calculated by the dead reckoning, the processor applies the difference as a control input to a state variable of a Kalman filter to calculate the error in the dead reckoning in the complex positioning.

8. The positioning device according to claim 1, wherein when, in the past epoch for which the error in the dead reckoning is calculated, an error in the position of the vehicle calculated by the GNSS positioning is greater than a predetermined threshold value, or a change amount of the error in the position of the vehicle calculated by the dead reckoning is greater than the predetermined threshold value, the complex positioning confirms a pseudorange in a latest epoch, and, when the pseudorange in the latest epoch does not have an error equal to or greater than the threshold value, the processor corrects neither the history of the position of the vehicle calculated by the dead reckoning nor the latest position of the vehicle in the complex positioning.

9. The positioning device according to claim 1, wherein when, in the past epoch for which the error in the dead reckoning is calculated, an error in the position of the vehicle calculated by the GNSS positioning is greater than a predetermined threshold value, or a change amount of the error in the position of the vehicle calculated by the dead reckoning is greater than the predetermined threshold value, the processor confirms whether the same error arises in an epoch following the past epoch, and, when the same error does not arise, the processor corrects neither the history of the position of the vehicle calculated by the dead reckoning nor the latest position of the vehicle in the complex positioning.

10. A positioning method, comprising:
 acquiring a position, a velocity, and an azimuth of a vehicle, Raw data, and a positioning augmentation signal from a global navigation satellite system (GNSS) receiver, the position, the velocity, and the azimuth of the vehicle being calculated from radio waves received from at least four GNSS satellites and the positioning augmentation signal received from a positioning augmentation satellite, the Raw data being extracted from the radio waves of the at least four GNSS satellites;
 calculating a position of the vehicle by dead reckoning;
 smoothing a pseudorange between each of the at least four GNSS satellites and the vehicle using a carrier wave phase included in the Raw data, the pseudorange being included in the Raw data;
 evaluating reliability of the position of the vehicle calculated by the GNSS receiver;
 conducting GNSS positioning to calculate a position of the vehicle from a smoothed value of the pseudorange, the positioning augmentation signal, an orbit of the GNSS satellite, and an evaluation result of the reliability of the position of the vehicle calculated by the GNSS receiver;
 conducting complex positioning to calculate an error in the dead reckoning from the position of the vehicle calculated by the GNSS positioning and to correct the position of the vehicle calculated by the dead reckoning based on the error in the dead reckoning; and
 outputting a corrected position of the vehicle which is corrected by the complex positioning,
 wherein the complex positioning includes calculating an error in the dead reckoning in a past epoch from a history of the position of the vehicle calculated by the dead reckoning and a history of the position of the vehicle calculated by the GNSS receiver and correcting the history of the position of the vehicle calculated by the dead reckoning and a latest position of the vehicle calculated by the dead reckoning based on the error in the dead reckoning in the past epoch.

* * * * *